United States Patent [19]

Hensley, Jr.

[11] 4,054,539

[45] Oct. 18, 1977

[54] CATALYST COMPRISING ULTRASTABLE ALUMINOSILICATES AND HYDROCARBON-CONVERSION PROCESSES EMPLOYING SAME

[75] Inventor: Albert L. Hensley, Jr., Munster, Ind.

[73] Assignee: Standard Oil Company (Indiana), Chicago, Ill.

[21] Appl. No.: 419,886

[22] Filed: Nov. 28, 1973

Related U.S. Application Data

[60] Continuation-in-part of Ser. No. 159,500, July 2, 1971, abandoned, which is a division of Ser. No. 204, Jan. 2, 1970, abandoned, which is a continuation-in-part of Ser. No. 788,832, Jan. 3, 1969, abandoned, which is a continuation-in-part of Ser. No. 753,294, Aug. 16, 1968, abandoned, which is a continuation-in-part of Ser. No. 616,876, Feb. 17, 1967, abandoned, which is a continuation-in part of Ser. No. 458,069, May 24, 1965, abandoned.

[51] Int. Cl.$^2$ .................... B10J 29/06; C10G 13/02
[52] U.S. Cl. .................................. 252/455 Z; 208/111
[58] Field of Search ...................... 252/455 Z; 208/111

[56] References Cited

U.S. PATENT DOCUMENTS

| | | | |
|---|---|---|---|
| 3,132,087 | 5/1964 | Kelley et al. | 208/60 |
| 3,159,568 | 12/1964 | Price et al. | 208/111 |
| 3,425,956 | 2/1969 | Baker et al. | 252/455 Z |

*Primary Examiner*—Carl F. Dees
*Attorney, Agent, or Firm*—James L. Wilson; Arthur G. Gilkes; William T. McClain

[57] ABSTRACT

The catalyst comprises the oxides of cobalt and molybdenum deposited on a co-catalytic acidic cracking support comprising ultrastable, large-pore crystalline aluminosilicate material and a silica-alumina cracking catalyst. This catalyst may be used in a hydrocracking process or a combination process for converting petroleum hydrocarbons to gasoline blending stock having an unleaded research octane number greater than about 105. The hydrocracking process comprises contacting the catalyst in a hydrocracking reaction zone under hydrocracking conditions with a feedstock having an initial boiling point of at least 350° F. The combination process comprises treating the hydrocarbons in the hydrocracking process, selectively solvent-extracting the aromatics from the resultant hydrocracked product to obtain an aromatic extract and a non-aromatic raffinate, catalytically reforming the non-aromatic raffinate, and blending the resultant catalytic reformate with aromatic extract.

7 Claims, 7 Drawing Figures

CATALYST COMPRISING ULTRASTABLE ALUMINOSILICATES AND HYDROCARBON-CONVERSION PROCESSES EMPLOYING SAME

CROSS-REFERENCES TO RELATED APPLICATIONS

This is a continuation-in-part application of co-pending application Ser. No. 159,500, filed on July 2, 1971, now abandoned which is a division application of application Ser. No. 204, filed on Jan. 2, 1970, and now abandoned. Ser. No. 204 is a continuation-in-part application of application Ser. No. 788,832, filed on Jan. 3, 1969, and now abandoned. Ser. No. 788,832 is a continuation-in-part application of application Ser. No. 753,294, filed on Aug. 16, 1968, and now abandoned. Ser. No. 753,294 is a continuation-in-part application of application Ser. No. 616,876, filed on Feb. 17, 1967, and now abandoned. Application Ser. No. 616,876 is, in turn, a continuation-in-part application of application Ser. No. 458,069, filed on May 24, 1965, and now abandoned.

BACKGROUND OF THE INVENTION

The invention pertains to a catalytic composition which contains an ultrastable, large-pore crystalline aluminosilicate material and which includes a Group VI metal or metal oxide and a Group VIII metal or metal oxide. The invention pertains further to processes of treating mineral oils which result in a chemical alteration of at least some of the hydrocarbon molecules of the mineral oils to form mineral oils having different properties, wherein the mineral oils are treated in a cracking step in the presence of hydrogen prior to any other conversion steps. In addition, the invention pertains to processes wherein there is included also at least one subsequent step of reforming and wherein there is employed a step directed to the purification, separation, or recovery of aromatic hydrocarbons.

Certain background prior art may be useful in the understanding of the present inventive process. Such background prior art comprises Kelley, et al., U.S. Pat. No. 3,159,564; Evans, et al., U.S. Pat. No. 3,222,416; and Hansford, et al., U.S. Pat. No. 3,008,895.

The Kelley, et al., patent is directed to a hydrofining-hydrocracking process wherein a catalyst containing a molecular sieve may be used in the hydrocracking step. This patent does not disclose the use of an ultrastable, large-pore crystalline aluminosilicate material as a constituent of the catalytic composition, nor does this patent disclose the use of such a catalyst in the disclosed hydrofining-hydrocracking process. Moreover, it does not disclose a combination process wherein hydrocracking is performed over a catalyst containing an ultrastable, large-pore crystalline aluminosilicate material and wherein a solvent-extraction process employing sulfolane is used to separate aromatics from a non-aromatic fraction.

The Evans, et al., patent is directed to a solvent-extraction process employing sulfolane solvents. This patent is not related to a hydrocarbon-conversion process. Moreover, the present invention is directed to a hydrocarbon-conversion catalyst and hydrocarbon-conversion processes. Some of the instant claims are directed to a combination hydrocarbon-conversion process employing as one element thereof an extraction process using sulfolane solvents. The Evans, et al., patent does not disclose, teach, or suggest that the solvent-extraction process disclosed therein be combined with other processing steps to produce gasoline blending stocks having an unleaded research octane number in excess of 105. Therefore, the present invention can be easily distinguished from the Evans, et al., patent.

The Hansford, et al., patent is directed to a combination hydrocarbon-conversion process wherein hydrocracking, separation and reforming steps are employed. However, the combination process of the Hansford, et al., patent will not provide gasoline blending stocks having unleaded research octane numbers in excess of 105. Not one of the octane values presented in the Hansford, et al., patent attains an unleaded research octane value as high as 101. Moreover, the Hansford, et al., combination hydrocarbon-conversion process does not employ a solvent-extraction process using sulfolane solvents and a hydrocracking process employing a hydrocracking catalyst which uses an acidic cracking support a component comprising a silica-alumina cracking catalyst and an ultrastable, large-pore crystalline aluminosilicate material.

SUMMARY OF THE INVENTION

Briefly, in accordance with the invention, there is provided an improved catalyst for hydrocracking a nitrogen-containing gas oil, a hydrocracking process employing this improved catalyst, and a combination process for producing high-octane motor gasoline blending components from petroleum fractions boiling above the gasoline boiling range.

The catalyst of this invention comprises a metallic hydrogenation component and a co-catalytic acidic cracking component, the co-catalytic acidic cracking component comprising an ultrastable, large-pore crystalline aluminosilicate material and a silica-alumina cracking catalyst. A preferred hydrogenation component is a mixture of the oxides of cobalt and molybdenum. A preferred acidic cracking component comprises about 5 to 50 weight percent of the ultrastable, large-pore crystalline aluminosilicate material suspended in a porous matrix of the silica-alumina cracking catalyst.

The hydrocracking process of this invention is a process for converting a petroleum hydrocarbon feedstock having an initial boiling point of at least 350° F. and containing a substantial amount of cyclic hydrocarbons to a lower-boiling product, which process comprises contacting the feedstock with the hydrocracking catalyst of this invention in the presence of a hydrogen-affording gas under hydrocracking conditions, including an average temperature between about 650° and about 850° F., and recovering a lower-boiling product containing at least about 25 volume percent aromatic hydrocarbons.

The combination process of this invention is a process for producing high-octane gasoline blending stock by hydrocracking in the presence of the catalytic composition of this invention a feed which is largely cyclic in nature under conditions which produce a hydrocracked gasoline having an aromatics content greater than about 25 volume percent, solvent extracting the hydrocracked gasoline to produce an aromatic extract fraction for premium grade gasoline blending and a substantially sulfur-free raffinate fraction which is catalytically hydroformed. Any sulfur compounds remaining in the hydrocracked gasoline are selectively removed from the raffinate in the solvent-extraction step. The raffinate is hydroformed to produce a high-octane reformate suitable for use as a premium grade gasoline blending stock. The reformate may be split to produce a light reformate fraction for blending into regular grade gasoline and a heavy reformate fraction which may be combined with the aromatic extract fraction for premium grade gasoline blending. The net production of hydrogen-rich reformer recycle gas from the hydroformer may be purified, if desired, by removing acid gases (e.g. HCl, $CO_2$, CO, $H_2S$, etc.) therefrom, such as by washing with water, caustic, amines, etc., and combined with make-up hydrogen to supply the hydrogen requirements for the hydrocracking step. The fraction of the hydrocrackate which boils above gasoline may be recovered as product and/or recycled to the hydrocracker.

BRIEF DESCRIPTION OF THE DRAWINGS

The operation of the process and the capabilities of the catalyst of the present invention and additional advantages thereof will be understood from the description of the invention which follows when read in conjunction with the accompanying drawings.

DESCRIPTION

Figure 1:
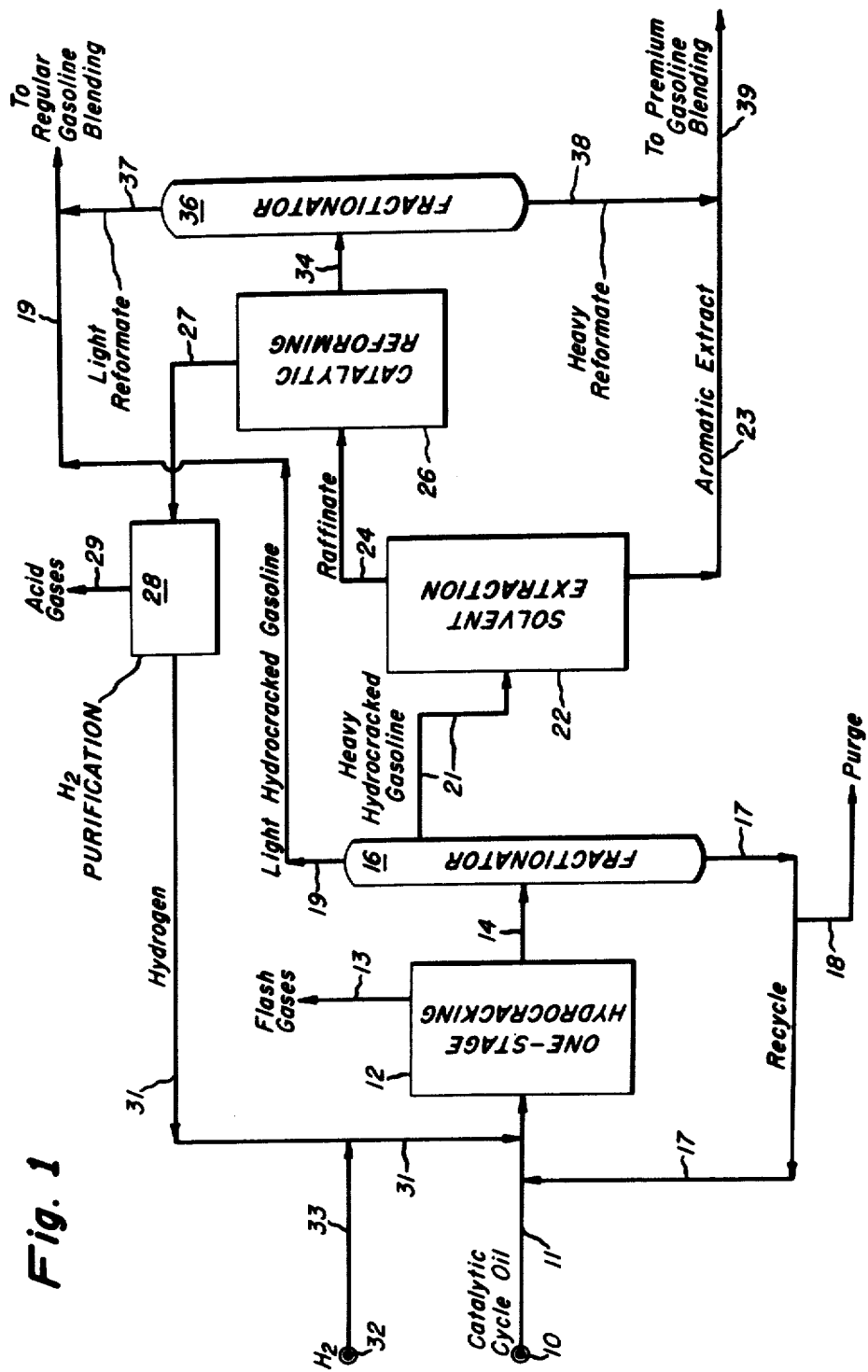
FIG. 1 is a highly simplified schematic flow diagram of a preferred embodiment of a combination process employed in the practice of the invention.

The invention provides a process for producing high-octane gasoline blending stock from gas oil containing a substantial amount of cyclic hydrocarbons, which process comprises contacting the gas oil and hydrogen under hydrocracking conditions with a particular hydrocracking catalyst in a hydrocracking reaction zone to produce a hydrocracked product containing a substantial amount of aromatic hydrocarbons, separating aromatic hydrocarbons from the hydrocracked product in a solvent-extraction zone by liquid-liquid extraction with a solvent selective for aromatics to produce an aromatic extract fraction and a raffinate fraction, and contacting said raffinate fraction and hydrogen in a hydroforming zone with a hydroforming catalyst under hydroforming conditions to produce a catalytic reformate, at least a portion of which reformate is suitable for blending with the aromatic extract fraction to produce a gasoline blending stock having an unleaded research octane number greater than about 105.

The process conditions employed in the hydrocracking step are selected so that the hydrocracked product fraction boiling in the gasoline boiling range which is separated from the hydrocracking effluent such as by distillation, for use as feed to the solvent-extraction zone contains at least about 25 volume percent aromatics preferably at least about 35 volume percent aromatics, optimally above about 40 percent.

A particularly suitable hydrocracking catalyst comprises a mixture of cobalt and molybdenum oxides supported on a co-catalytic cracking support containing a silica-alumina cracking catalyst and about 5 to 50 weight percent of an ultrastable, large-pore crystalline aluminosilicate material dispersed or suspended in a porous matrix of the silica-alumina cracking catalyst. Preferably, the cracking catalyst is a low-alumina silica-alumina cracking catalyst. The catalyst is preferably contacted with the gas oil and hydrogen at a temperature higher than that normally employed in the industry for hydrocracking, i.e., a temperature in the range of about 650° to 850° F., preferably between about 680° and 800° F.

A preferred selective solvent for use in the solvent extraction step is sulfolane. A suitable extraction step for use in this invention is described in *Petroleum Refiner*, Volume 38, No. 9, pages 195-192, and in U.S. Pat. No. 3,222,416, Evans, et al., assigned to Shell Oil Company.

A preferred hydroforming process for reforming of the raffinate is hydroforming with platinum-containing catalyst. A particularly suitable regenerative hydroforming process for use in the reforming step is described in U.S. Pat. No. 2,773,014, issued to J. F. Snuggs, et al.

The preferred feedstock for the process of this invention is catalytic cycle oil from fluid catalytic cracking of virgin gas oil and/or light virgin gas oil from naphthenic crudes.

This combination process is indeed an advance in the art. It advantageously provides significant yields of very high-octane gasoline material without the use of lead-containing anti-knock compounds. Such a process may be used to produce high-octane motor fuels which will not result in the introduction of lead compounds into the atmosphere from automobile exhausts to contribute to the pollution of the air in today's highly industrialized and mechanized society.

The surprising success of the combination process of this invention in producing a greater yield of very-high-octane gasoline blending stock than is possible with prior art processes, and accomplishing this at lower cost, is due primarily to the discovery of the particular combination of processing steps employing the particular hydrocracking process of this invention as one of the steps. It is important that the feed to the hydrocracking step be one from which highly aromatic hydrocracked gasoline can be produced. The particular hydrocracking catalyst and hydrocracking process conditions employed are also quite important. As is pointed out in greater detail below, the hydrocracking catalyst of this invention may be employed at a higher hydrocracking temperature than that normally employed in the industry. Surprisingly, this hydrocracking temperature can be employed with this particular catalyst with low catalyst activity decline rate, and sulfur and nitrogen need not be removed from the feed, permitting one-stage hydrocracking to be used in the hydrocracking step.

Sulfolane is a preferred solvent for use in the solvent extraction step because of its high capacity which results in smaller equipment size and lower solvent circulation rates than with other solvents.

One-stage hydrocracking employing the catalyst of this invention is preferred for the hydrocracking step because of greater aromatics production and also lower equipment requirements, such as fewer reactor pressure vessels.

The hydrocarbon feedstock to be charged to the hydrocracking unit may boil in the range between about 350° and about 1,000° F. When operating to maximize gasoline production, the feedstock preferably has an end-point not greater than about 700°–750° F. Typically, a light catalytic cycle oil, or a light virgin gas oil, or mixtures thereof, boiling in the range of from about 350° to 650° F. is employed as a feedstock. The feed may be pre-treated to remove compounds of sulfur and nitrogen. However, when employing the preferred hydrocracking catalyst, it is not necessary to pre-treat the feed to remove sulfur and nitrogen contaminants The feed may have a significant sulfur content, ranging from 0.1 to 3 weight percent, and nitrogen may be present in an amount up to 500 parts per million (ppm), or more. Temperature, space velocity, and other process variables may be adjusted to compensate for the effects of nitrogen on the hydrocracking catalyst activity.

The hydrocarbon feed preferably contains a substantial amount of cyclic hydrocarbons, i.e., aromatic and/or naphthenic hydrocarbons, since such hydrocarbons have been found to be especially well-suited for providing a highly aromatic hydrocracked gasoline product. Advantageously, the feed contains at least about 35 to 40 percent aromatics and/or naphthenes.

Such a feedstock permits the production of hydrocracked gasoline product having about 25 to 30 percent aromatics. A preferred feed is a light catalytic cycle oil containing approximately 40 percent aromatics and 20 percent naphthenes, and with this feed a hydrocracked gasoline product is produced containing about 45 to 50 percent aromatic hydrocarbons. Paraffins are easily cracked, but produce a lower quality gasoline product. Olefinic naphthas containing light normal olefins may be mixed with the feed, since small amounts of such olefins have been found to be effective in increasing the hydrocracking conversion level.

Typically, the feedstock is mixed with a hydrogen-affording gas and preheated to the hydrocracking temperature, then transferred to one or more hydrocracking reactors. Advantageously, the feed is substantially completely vaporized before being introduced into the reactor system. For example, it is preferred that the feed be all vaporized before passing through more than about 20 percent of the catalyst bed in the reactor. In some instances, the feed may be in a mixed vapor-liquid phase, and the temperature, pressure, recycle, etc., may be adjusted then for the particular feedstock to achieve the desired degree of vaporization.

The feedstock is contacted in the hydrocracking reaction zone with the hereinafter-described hydrocracking catalyst in the presence of hydrogen-affording gas. Hydrogen is consumed in the hydrocracking process and an excess of hydrogen is maintained in the reaction zone. Advantageously, a hydrogen-to-oil ratio of at least 5,000 standard cubic feet of hydrogen per barrel of feed (SCFB) is employed, and the hydrogen-to-oil ratio may range up to 20,000 SCFB. Preferably, about 8,000 to 12,000 SCFB is employed. A high hydrogen partial pressure is desirable from the standpoint of prolonging catalyst activity maintenance.

The hydrocracking reaction zone is operated under conditions of elevated temperature and pressure. The total hydrocracking pressure usually is between about 700 and 3,000 pounds per square inch gauge (psig) and, preferably, between about 1,000 and 1,800 psig. The hydrocracking reaction is exothermic in nature and a temperature rise occurs across the catalyst bed. Therefore, the inlet temperature to the hydrocracking reaction zone may be 20° to 30° F. lower than the exit temperature. The average hydrocracking catalyst bed temperature is between about 650° and 850° F., and preferably a temperature between about 680° and 800° F. is maintained. Since the preferred catalyst has been found to have a high initial activity which declines rapidly before leveling out for a run, it may be advantageous to come on stream initially a temperature between about 500° and 600° F., when using fresh catalyst of the preferred type, and then raise the temperature to the above range after the initial catalyst activity decline has occurred. The liquid hourly space velocity (LHSV) typically is between 0.5 and 5 volumes of feed per hor per volumes of catalyst, and preferably between 1 and 3 LHSV. Optimally, 1 to 2 LHSV is employed.

The catalyst of this invention, a catalytic composition to be used for hydrocracking petroleum hydrocarbon streams, comprises a metallic hydrogenation component and a co-catalytic acidic cracking component, which cracking component comprises about 5 to 50 weight percent of an ultrastable, large-pore crystalline aluminosilicate material and a silica-alumina cracking catalyst. A low-alumina silica-alumina cracking catalyst is prefered. Preferably, the ultrastable aluminosilicate material is suspended in the porous matrix of the silica-alumina.

Certain naturally-occurring and synthetic aluminosilicate materials, such as faujasite, mordenite, X-type and Y-type aluminosilicate materials, are commercially available and are effective cracking components for hydrocarbon conversion catalysts. These aluminosilicate materials may be characterized and adequately defined by their X-ray diffraction patterns and compositions. Characteristics of such aluminosilicate materials and methods for preparing them have been presented in the chemical art. Their structure is composed of a network of relatively small cavities, which are interconnected by numerous pores which are smaller than the cavities. These pores have an essentially uniform diameter at their narrowest cross section. Basically, the crystal structure is a fixed three-dimensional and ionic network of silica and alumina tetrahedra. These tetrahedra are linked to each other by the sharing of each of their oxygen atoms. Cations are included in the cavities in the crystal structure to balance the electrovalence of the tetrahedra. Examples of such cations are metal ions, ammonium ions, and hydrogen ions. One cation may be exchanged either entirely or partially for another by means of techniques which are well known to those skilled in the art.

There is now available an ultrastable, large-pore crystalline aluminosilicate material. This ultrastable, large-pore crystalline aluminosilicate material, sometimes hereinafter referred to as "ultrastable aluminosilicate material", is the aluminosilicate material that is employed in the catalytic composition of the present invention. It is an important component of that catalytic composition and is believed to be quite different from the prior art aluminosilicates employed in hydrocarbon conversion catalysts. It is an ultrastable material, that is, it is stable to exposure to elevated temperatures and is stable to repeated cycles of wetting and drying.

As will be shown hereinafter, the ultrastable, large-pore crystalline aluminosilicate material is characterized by an apparent composition which comprises more than 7 moles of silica per mole of alumina in its framework.

The ultrastable aluminosilicate material, which is derived from faujasitic materials, is a large-pore material. By large-pore material is meant a material that has pores which are sufficiently large to permit the passage thereinto the benzene molecules and larger molecules, and the passage therefrom of reaction products. For use in catalysts that are employed in petroleum hydrocarbon conversion processes, it is preferred to employ a large-pore crystalline aluminosilicate material having a pore size within the range of about 8 to about 20 Angstrom units (A). The ultrastable aluminosilicte material of the catalyst of the present invention possesses such a pore size.

An example of the ultrastable, large-pore crystalline aluminosilicate material that may be employed in the catalyst of this invention is Z-14US Zeolite. Several types of Z-14US Zeolites are considered in the U.S. Pat. Nos. 3,293,192 and 3,449,070. An example of a typical X-ray diffractin pattern, along with the description of the method of measurement, is presented in U.S. Pat. No. 3,293,192. This X-ray diffraction patern is essentially the same as that shown in Table I:

TABLE I

A 14.15
8.65
7.37
5.604
4.691
4.312
3.85
3.717
3.41
2,976
2.8
2.724
2.597

The ultrastable aluminosilicate material is quite stble to exposure to elevated temperatures. This stability to elevated temperatures is discussed in U.S. Pat. No. 3,293,192 and in U.S. Pat. No. 3,449,070 and may be demonstrated by a surface area measurement after calcination at 1,725° F. For example, after a 2-hour calcination at 1,725° F., a surface area that is greater than 150 square meters per gram ($M^2$/gm) is retained. Moreover, its stability has been demonstrated by a surface area measurement after a steam treatment with an atmosphere of 25 percent steam at a temperature of 1,525° F. for 16 hours. As shown in U.S. Pat. No. 3,293,192, examples of the ultrastable aluminosilicate material Z-14US Zeolite have a surface area after this steam treatment that is greater than 200 $M^2$/gm.

The ultrastable aluminosilicate material exhibits extremely good stability toward wetting, which is defined as that ability of a particular aluminosilicte material to retain surface area or nitrogen-adsorption capacity after contact with water or water vapor. As is shown hereinafter, ultrastable, large-pore crystalline aluminosilicte material containing about 2 percent sodium (the "soda" form of the ultrastable aluminosilicate material) exhibited a loss in nitrogen-adsorption capacity that is less than 2 percent per wetting, when tested for stability to wetting according to the procedure presented hereinafter in Example IV.

While the aluminosilicate component of the catalytic composition of the present invention exhibits extremely good stability toward wetting, there is no suggestion that the catalytic composition itself is possessed of such stability and that it will perform satisfactorily in the presence of large amounts of steam for prolonged periods of time. Abbreviated tests suggest that the catalyst will deteriorate in the prolonged presence of substantial amounts of water.

The cubic unit cell dimension of the ultrastable, large-pore crystalline aluminosilicate material is within the range of about 24.20 to about 24.55 A. Since the X-ray techniques employed today to measure this dimension are much more sophisticated and accurate than those used to obtain the earlier measurements, this range has been slightly enlarged over that which had been disclosed previously in Ser. No. 753,294. This range of values is below those values shown in the prior art for X-type, Y-type, hydrogen-form, and decationized aluminosilicates.

As presented hereinafter in Example V, the infrared spectra of a typical example of dry ultrastable, large-pore crystalline aluminosilicate material shows a prominent band near 3700 $cm^{-1}$(3695±5$cm^{-1}$), a band near 3750 $cm^{-1}$(3745±5$cm^{-1}$)and a band near 3625 $cm^{-1}$(±10$cm^{-1}$). An ultrastable aluminosilicate material characterized by these infrared bands is the preferred ultrastable, large-pore crystalline aluminosilicate material. The band near 3750 $cm^{-1}$ is typically seen in the spectra of all synthetic faujasites. The band near 3625 $cm^{-1}$ is usually less intense and varies more in apparent frequency and intensity with different levels of hydration. The band near 3700 $cm^{-1}$ is usually more intense than the 3750 $cm^{-1}$ band. This band near 3700$cm^{-1}$ is particularly prominent in the spectra of the soda form of the preferred ultrastable aluminosilicate material, which contains about 2 to 3 weight percent sodium.

One of these two hydroxyl bands which appear to be unique, the band near 3700 $cm^{-1}$, has been attributed to the stretching vibration of hydroxyl groups attached to aluminum atoms, since the spectrum of alumina exhibits a similar band. No spectra of decationized Y-type aluminosilicates that have been known to be published to date show a band near 3700 $cm^{-1}$. Such a band has not been mentioned in connection with such spectra. No assignment is immediately obvious for the hydroxyl band near 3625 $cm^1$.

It is believed that a substantial proportion or amount of the preferred ultratable, large-pore crystaline aluminosilicate material is characterized by the apparently unique, well-defined hydroxyl bands near 3700 $cm^{-1}$ and near 3625 $cm^1$. By a substantial porportion is meant a major part of the ultrastable aluminosilicate material, i.e., an amount in excess of 50 weight percent.

While the above-mentioned two bands which appear near 3700 $cm^{-1}$ and near 3625 $cm^{-1}$, respectively, appear to be characterisic of the preferred ultrastable aluminosilicate material which is a component of the catalytic composition employed in this invention, it is quite possible that they might appear, at a weak intensity, in the infrared spectra of a decationized Y-type or other aluminosilicate material, if that aluminosilicate material were to be subjected to certain treatments.

It is believed that the preferred ultrastable, large-pore crystalline aluminosilicate material of the catalytic composition that is employed in the process of this invention can be identified properly by the hydroxyl infrared bands near 3700 $cm^{-1}$ and near 3625 $cm^1$, particularly the former, when considered in conjunction with the characteristic small cubic unit cell dimension. For example, such identification or description will distinguish the preferred ultrastable aluminosilicate material from the "high-silica" faujasites described in Dutch Patent Application No. 6707192, which have the small cubic unit cell but do not exhibit the 3700 cm$^{-1}$ and 3625 cm$^{-1}$ infrared bands. Furthermore, if unstable decationized Y-type aluminosilicate materials were to receive certain treatments to provide hydroxyl infrared bands near 3700 cm$^{-1}$ and near 3625 cm$^{1}$, such aluminosilicate materials would not exhibit the appropriate smaller cubic unit cell dimension that is characteristic of the preferred ultrastable, large-pore crystalline aluminosilicate material.

In addition to the unique infrared bands and the smaller cubic unit cell dimension, the preferred ultrastable, large-pore crystalline aluminosilicate material is characterized by a sodium content that is less than 1 weight percent sodium.

Ultrastable, large-pore crystalline aluminosilicate material can be prepared from certain faujasites by subjecting the latter to special treatment under specific conditions. Typical preparations of ultrastable, large-pore crystalline aluminosilicate material are considered in U.S. Pat. No. 3,293,192 and in U.S. Pat. No. 3,449,070. The preferred ultrastable, large-pore crystalline, aluminosilicate material may be prepared by a method of preparation which usually involves a first step wherein most of the alkali metal cation is cation-exchanged with an ammonium salt solution to leave approximately enough alkali metal cations to fill the bridge positions in the faujasite structure. After this cation-exchange treatment, the aluminosilicate material is subjected to a heat treatment at a temperature within the range of about 700° C. (1,292° F.) to about 800° C. (1,472° F.). The heat-treated aluminosilicate material is then subjected to further cation-exchange treatment to remove additional residual alkali metal cations. The preferred material may be prepared by methods of preparation disclosed in U.S. Pat. No. 3,449,070 and by Procedure B presented in the paper "A New Ultra-Stable Form of Faujasite" by C. V. McDaniel and P. K. Maher, presented at a Conference on Molecular Sieves held in London, England in April, 1967. The paper was published in 1968 by the Society of Chemical Industry.

As the amount of alkali metal cations is reduced, the intensity of the unique infrared bands is attenuated. However, since the alkali metal cations are not removed completely from the preferred ultrastable aluminosilicate material, the unique infrared bands remain in its infrared spectra.

Figure 6:
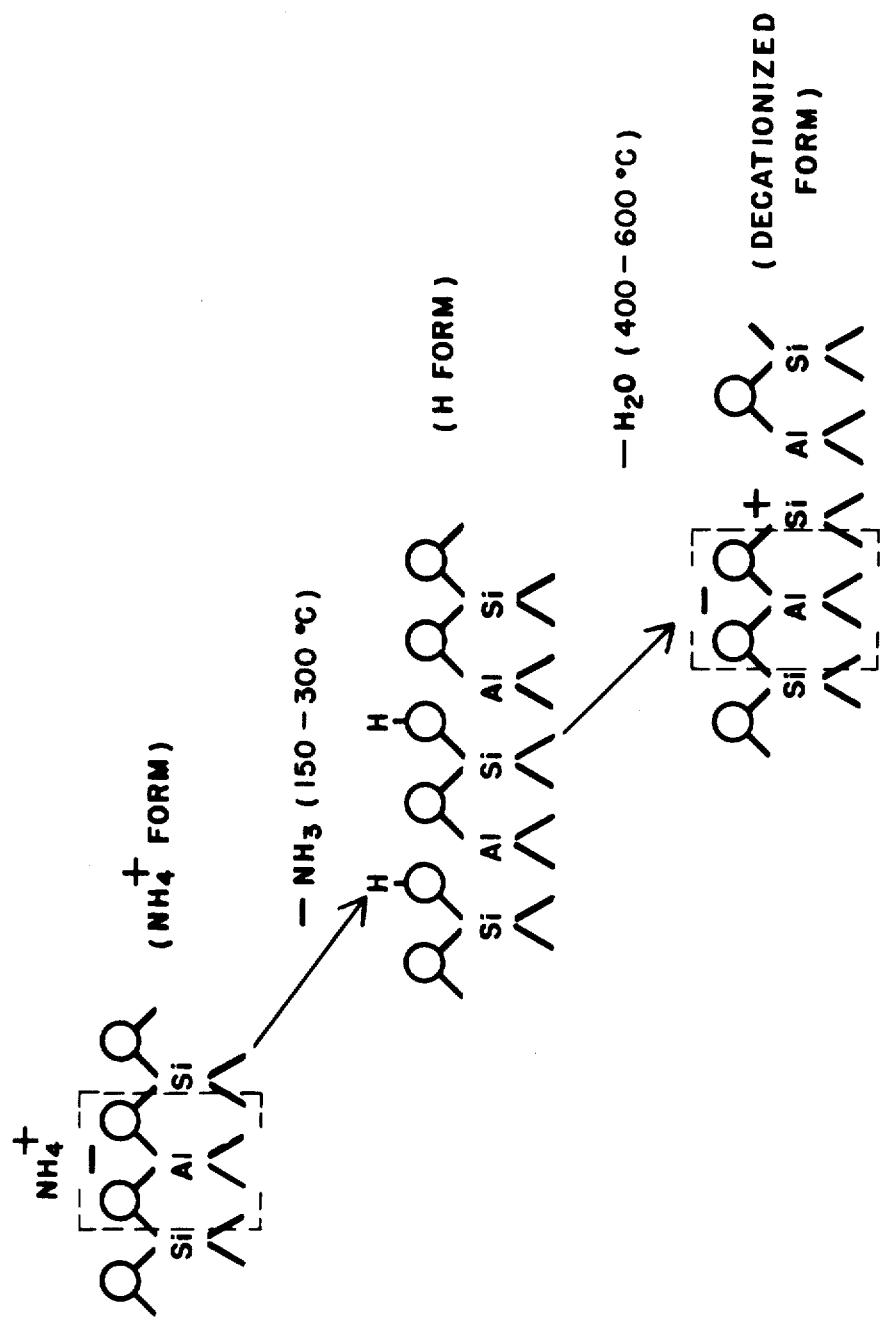
FIGS. 6 and 7 present a pictorial representation of a proposed mechanism for the formation of the ultrastable, large-pore crystalline aluminosilicate material.
Figure 7:
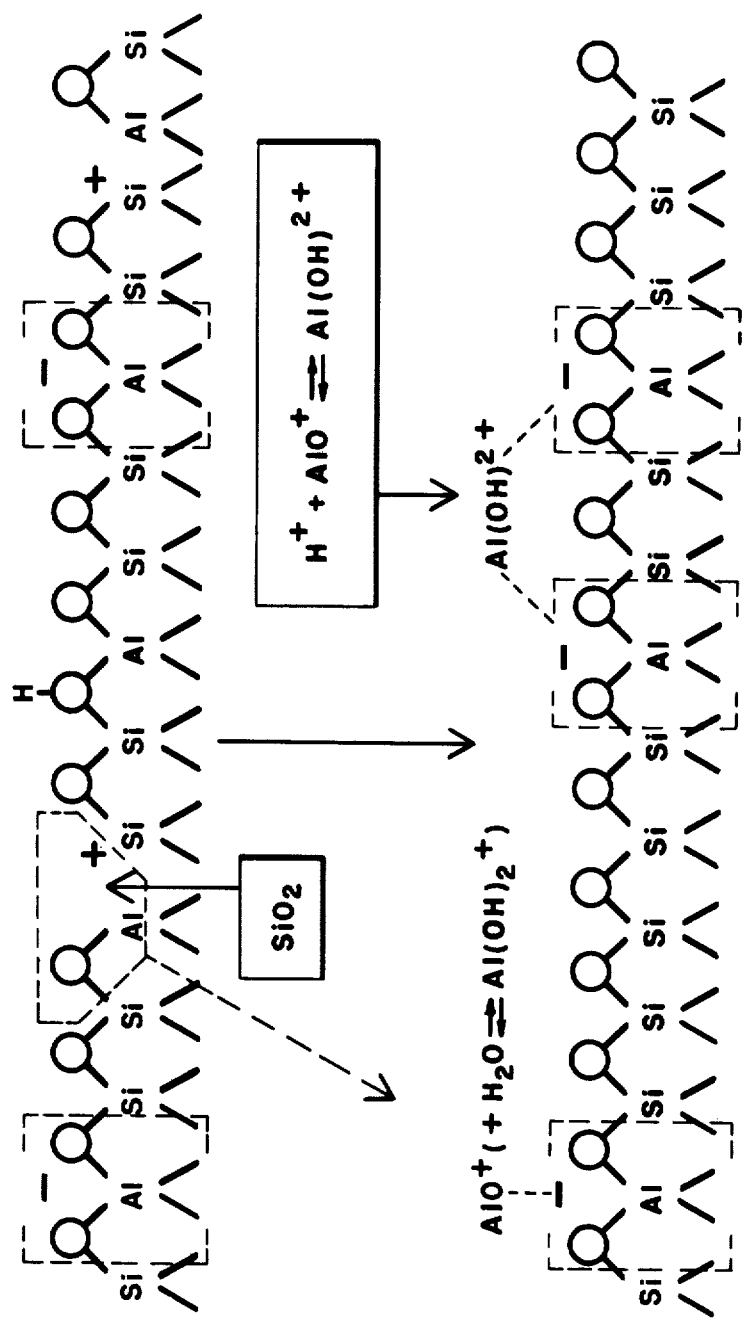

It is believed that the stablization of the large-pore crystalline aluminosilicate material involves the migration of aluminum ions from the tetrahedral sites in the framework of the crystal structure to cation positions outside the framework. It is believed that the aluminum outside of the framework forms one or more of the following cations to fill the sites that have been vacated previously by the alkali metal cations. These aluminum-containing cations include $Al(OH)_2$, $Al(OH)^{2+}$, $Al0^+$, or $Al^{3+}$. It appears that partial recrystallization occurs readily at temperatures within the range of about 700° C. (1,292° F.) to about 800° C. (1,472° F.). This partial recrystallization appears to be promoted by water vapor and in essence permits the migration of $SiO_2$ to fill the voids left in the framework by the removal of the aluminum atoms. There is presented in FIGS. 6 and 7 a pictorial representation of a proposed mechanism for the formation of the ultrastable aluminosilicate material. It is believed that the crystal structure of the resulting ultrastable, large-pore crystalline aluminosilicate material may be represented properly as presented in FIG. 7. This diagram shows an $NH^+_4$ ion in the place of a removed sodium ion, subsequent change of the $NH^+_4$ form to the hydrogen form, change of the hydrogen form to the decationized form, and subsequent change of the decationized form to the ultrastable material.

In the decationized faujasites, voids remain in the oxide framework as an indirect result of the removal of the alkali metal cations. However, in the case of the ultrastable, large-pore crystalline aluminosilicate material, such voids have been filled by oxide ions and by replacing aluminum with silicon atoms in the framework, the electrovalence of residual aluminum tetrahedra being compensated by aluminum-containing cations held outside the framework. This suggested mechanism is not fully understood and is presented for illustration only and is not intended to limit the scope of the present invention. This suggested structure appears to be a reasonably correct representation of the structure of the ultrastable, large-pore crystalline aluminosilicate material and is supported by appreciable evidence.

The ion-exchange capacity of the ultrastable, large-pore crystalline aluminosilicate material appears to be appreciably smaller than that of decationized aluminosilicate material. This reduced ion-exchange capacity suggests that fewer aluminum atoms are available in the ultrastble, large-pore crystalline aluminosilicate material structure to associate themselves with cations.

The cubic unit cell dimension of the ultrastable aluminosilicate material is smaller than that of Y-type aluminosilicates and decationized Y-type aluminosilicate material. Since it is postulated that the shorter Si-O bonds replace Al-O bonds, the contraction of the cubic unit cell dimension agrees with the higher amount of silicon in the crystal structure. The cubic unit cell dimension that would be expected for faujasite structures of a given silica-to-alumina ratio can be calculated by various methods. In each method to date, it is assumed that the cubic unit cell dimension ($a_o$) varies linearly with the aluminum content. In Dutch Patent Application No. 6707192, Eberly, et al., assume that the change in cubic unit cell dimension resulting because of the replacement of Al-O bonds by Si-O bonds is proportional to the difference in bond length for Si-O (1.61 A) and Al-O (1.70 A). The data of Eberly, et al., in their Table II supports a cubic unit cell dimension of about 24.30 A for that of "pure-silica" faujasite. In view of this value, $a_o$ may be represented by the following equation:

$$a_o = 24.30 (1 + 0.055x)$$

where $x$ is the fraction of framework tetrahedral sites occupied by aluminum atoms. Since the silica-to-alumina ratio is 2 times the silicon-to-aluminum ratio, $$SiO_2\text{- to -}Al_2O_3 = \frac{2(1.0 - \text{fraction occupied by aluminum atoms})}{\text{fraction occupied by aluminum atoms}}$$

or $$SiO_2\text{- to -}Al_2O_3 = \frac{2.674 - 2.00 (a_o - 24.30)}{a_o - 24.30}$$

As shown hereinbelow, a cubic unit cell dimension of 24.52 A has been observed experimentally for the preferred ultrastable aluminosilicate material. using the above relationship, The silica-to-alumina ratio of the ultrastable aluminosilicate material maybe calculated as a small amount over 10.

In a paper read at the Conference on Molecular Sieves held in London, England in April 1967, and published by the Society of Chem. Ind., London (1968), on page 53, Break, et al., give an empirical relation for the cubic unit cell dimension as:

$$a_o = \frac{192b}{1 + N_{Si}/N_{Al}} + c$$

where $b = 0.00868$ and $c = 24,191$. Calculated from this relation, the silica-to-alumina ratio of ultrastable aluminosilicate material is 8.1.

In either case, the calculated silica-to-alumina ratio is substantially above the maximum value of less than 6 obtained by direct aqueous synthesis. In view of the above, the proposed structure for ultrastable aluminosilicate material having a higher silica-to-alumina ratio is supported by the correlation between cubic unit cell dimension and silica-to-alumina ratio.

Data obtained from infrared spectral analyses indicate the presence of new hydroxyl bands and the disappearance of old ones. The 2 new bands, namely, those near 3700 cm$^{-1}$ and 3625 cm$^{-1}$, suggest both $Al(OH)_2{}_+$ and $Al(OH)^{2+}$ ions. One of these bands disappears more rapidly than the other, when the material is subjected to drying. It is believed that this band is associated with the $Al(OH)+_2$ ions which dehydrate readily while the other band is believed to be related to the $Ai(OH)^{2+}$ ions, which do not dehydrate readily. It has been found that both of these bands can be regenerated by restoring water to the material.

When the ultrastable, large-pore crystalline aluminosilicate material is contacted with acetylacetone, a considerable amount of alumina is extracted from the ultrastable aluminosilicate material. This is quite similar to the formation of extractable alumina which has been shown by Eberly, et al., when they steam ammonium-form Y-type aluminosilicate material. This steaming treatment produces the migration of alumina out of the crystal structure of the aluminosilicate material with the resultant increase in the silica-to-alumina ratio of the aluminosilicate material.

The ultrastable, large-pore crystalline aluminosilicate material has been found to possess low adsorption of carbon monoxide and nitrous oxide (No). This lack of appreciable adsorption of carbon monoxide or nitrous oxide indicates that few aluminum cations are accessible. This suggests the presence of little or no $Al^{3+}$ ions.

The ultrastable, large-pore crystalline aluminosilicate material possesses improved stability over other aluminosilicate materials. For example, the ultrastable, large-pore crystalline aluminosilicate material furnishes a greater stability to dry heating to elevated temperatures, to repeated cycles of wetting and drying, to acids, and to the action of chelating agents. This improved stability to dry heating to elevated temperatures and stability to repeated wetting and drying cycles, which will be discussed further hereinafter, also supports the proposed structure.

In summary, the proposed structure for the ultrastable, large-pore crystalline aluminosilicate material is supported by: (1) reduced ion-exchange capacity; (2) contraction of the cubic unit cell dimension; (3) higher silica-to-alumina ratio in the crystal structure; (4) the indication by the infrared spectral data of the presence of new hydroxyl bands and the disappearance of old hydroxyl bands; (5) the formation of extractable alumina; (6) the low adsorption of carbon monoxide and nitrous oxide; and (7) improved stability. This proposed structure is presented for th purpose of aiding one in understanding the present invention and is not intended to limit the scope of the invention in any way whatsoever.

The catalytic composition that is employed in the present invention may be characterized by its ability to be regenerated at a temperature which is less than 900° F., even though a principal constituent of this catalytic composition is the ultrastable, large-pore crystalline aluminosilicate material. As shown hereinafter in Example VII, the catalyst of this invention was satisfactorily regenerated. Such regeneration is contrary to the teachings of recent U.S. Pat. No. 3,197,397, which suggested that catalysts containing molecular sieves and an associated Group VIII metal should be regenerated at temperatures above 900° F. for effective regeneration. This recent patent alleged that such a catalyst would require a temperature that is 50° to 150° F. higher than that which would be required for the fresh catalyst to provide equivalent conversions. The data in Example VII presented hereinafter demonstrates that the catalytic composition of the present invention was regenerated to such an extent that the regenerated catalyst after the first regeneration required a temperature that was less than 10° higher than that required by the fresh material to provide equal conversions. It is believed that the catalyst's ability to be regenerated at the lower temperatures is due, at least in part, to the presence of the ultrastable aluminosilicate material.

In view of the fact that the ultrastable, large-pore crystalline aluminosilicate material has a superior stability to any form of moisture, it is believed that thi particular aluminosilicate material or a catalytic composition containing this particular aluminosilicate material can be impregnated with an aqueous solution of selected components without the water of the solution appreciably affecting the structure and/or crystal linity of the aluminosilicate material. While it is known that specific aluminosilicate materials cannot readily withstand water, the ultrastable, large-pore crystalline aluminosilicate material of the catalytic composition of the present invention is quite stable in the presence of water and therefore can be distinguished over many of the prior art aluminosilicate materials.

While it is preferable to employ the ultrastable, large-pore crystalline aluminosilicate material suspended in the porous matrix of the silica-alumina cracking catalyst as the base for the hydrogenation component, the aluminosilicate component may be dispersed in or physically admixed with a porous matrix material of silica-alumina. Silica-alumina cracking catalyst containing from about 10 to 50 weight percent alumina is preferred matrix material. The ultrastable crystalline aluminosilicate material may be present in any suitable amount, and typically about 5 to 50 weight percent aluminosilicate is employed in preparing the hydrocracking catalyst. The aluminosilicate-matrix catalyst support may be prepared by various well-known methods and formed into pellets, pills, or extrudates. The hydrogenation component may be placed on the catalyst support by impregnation or mixing with solutions of one or more of the metal components during the manufacture.

There are a number of well-known hydrogenation components that may be employed in hydrocracking catalysts. The hydrogenation component of the catalytic composition of the present invention is a mixture of cobalt of molybdenum oxides which provides an especially durable long-life catalyst particularly well-suited for hydrocracking virgin gas oils or catalytic cycle oils containing appreciable quantities of sulfur and nitrogen compounds. Typically, the catalyst contains from about 4 to 15 weight percent molybdenum trioxide and from about 2 to 5 weight percent cobalt oxide. While the hydrogenation component is initially a mixture of the oxides of the metals, it is believed that during the use of the catalyst the oxides may be converted to the sulfides and/or elemental forms of the metals. Therefore, after some use, it is conceivable that the hydrogenation component may comprise one of the following: cobalt and molybdenum, their oxides, their sulfides, and mixtures thereof.

The catalyst support can be prepared by reducing the ultrastable, large-pore crystalline aluminosilicate material to a small particle size and intimately admixing it with the matrix material. Typically, the ultrastable aluminosilicate material is mixed with the silica-alumina while the latter is in a hydrous state, for example, a hydrosol or a hydrogel. Then, the aluminosilicate-containing hydrosol or hydrogel is dried and shaped into the desired form. Thereafter, the aluminosilicate silica-alumina support may be washed free of soluble salts and dried or calcined. The total alkali metal content of the resulting composite preferably is reduced to a low level, preferably to less than about 1 weight percent of the total composite by treatment as mentioned above. Thereafter, the hydrogenation component is placed on the catalyst support, for example, by impregnating the support with solutions of suitable organic or inorganic salts of cobalt and molybdenum.

If desired, the ultrastable, large-pore crystalline aluminosilicate material may be physically admixed with particles of the matrix material and a suitable binder, and the resulting mixture shaped by pelleting, extrusion, or the like. Conveniently, the hydrogenation component may be deposited on the aluminosilicate material-matrix mixture in the manner described above.

DESCRIPTION OF PREFERRED EMBODIMENTS

Referring now to FIG. 1, an illustrative embodiment of the invention for processing 20,000 barrels per day (B/D) of light catalytic oil (400°-650° F. ASTM boiling range) will be described. Catalytic cyclic oil from feed source 10 is fed at a rate of 20,000 B/D via line 11 to the one-stage hydrocracking section 12 which is operated at a temperature in the range of about 700° to 825° F. and employs a catalyst comprising cobalt and molybdenum oxides supported on silica-alumina containing an ultrastable, large-pore crystalline aluminosilicate material.

The hydrocracking conditions employed in the hydrocracking section 12 are controlled to produce about 76–78 percent conversion of the gas oil feed per pass. Flash gases produced during the hydrocracking are withdrawn via line 13. Liquid hydrocracking effluent from the one-stage hydrocracking section 12 is passed via line 14 to distillation column fractionator 16 wherein material boiling above about 380° F. is recovered from the remainder of the product and recycled via line 17 to the fresh feed line 11. If desired, a portion of this bottoms recycle stream may be withdrawn via purge line 18. Light hydrocracked gasoline is distilled overhead from the distillation column 16 and passed via line 19, as a product of the process, to the regular grade gasoline blending pool along with a light reformate stream described below.

A side-stream of heavy hydrocracked gasoline in an amount of about 12,319 B/D is withdrawn from the distillation column 16 and passed via line 21 to the solvent extraction section 22. This heavy hydrocracked gasoline has an ASTM boiling range of about 180° to 380° F. It is often beneficial to split this stream, extracting the 180° to 275° F. fraction and by-passing the 275° to 380° F. material around the extraction step directly to the reformer. It is also often beneficial to use a cut-point between light and heavy hydrocracked gasoline of about 220° F. rather than 180° F. Solvent extraction section 22 is a liquid-liquid solvent extraction which preferably employs sulfolane as the solvent for separating the heavy hydrocracked gasoline into a non-aromatic raffinate fraction and an aromatic extract fraction. The aromatic extract fraction, 4,899 B/D, is withdrawn from the solvent extraction section and passed via line 23 to premium gasoline blending. The raffinate fraction, 7,420 B/D, is withdrawn from the solvent extraction section 22, preferably water-washed in conventional facilities not shown, and passed via line 24 to the catalytic hydroforming section 26 wherein the raffinate is hydroformed under Ultraforming conditions as described above to produce catalytic reformate and hydrogen.

Hydrogen off-gas is withdrawn from the hydroformer 26 via line 27 and passed to hydrogen purification section 28 wherein acid gases are removed and vented via line 29. The hydrogen purification section comprises a water wash to remove chlorides and methanator to remove carbon oxides by converting them to methane. The purified hydrogen stream from the hydrogen purification section 28 is passed via line 31 as makeup hydrogen into the hydrocracking section feed line 11. Additional makeup hydrogen from source 32 is passed via line 33 into line 31.

Catalytic reformate, 5,433 B/D, is withdrawn from the catalytic reformer 26 and passed via line 34 into a second distillation column fractionator 36 wherein 1,312 B/D of light reformate are distilled overhead and passed via line 37 to regular grade gasoline blending. A quantity of 4,121 B/D of heavy reformate, toluene and heavier material, is withdrawn as bottoms from the distillation tower 36 and passed via line 38 to premium gasoline blending via line 39 with the 4,899 B/D of aromatic extract from line 23 to produce 9,020 B/D of premium gasoline blending stock having an unleaded (clear) research octane rating of 110.5.

Figure 2:
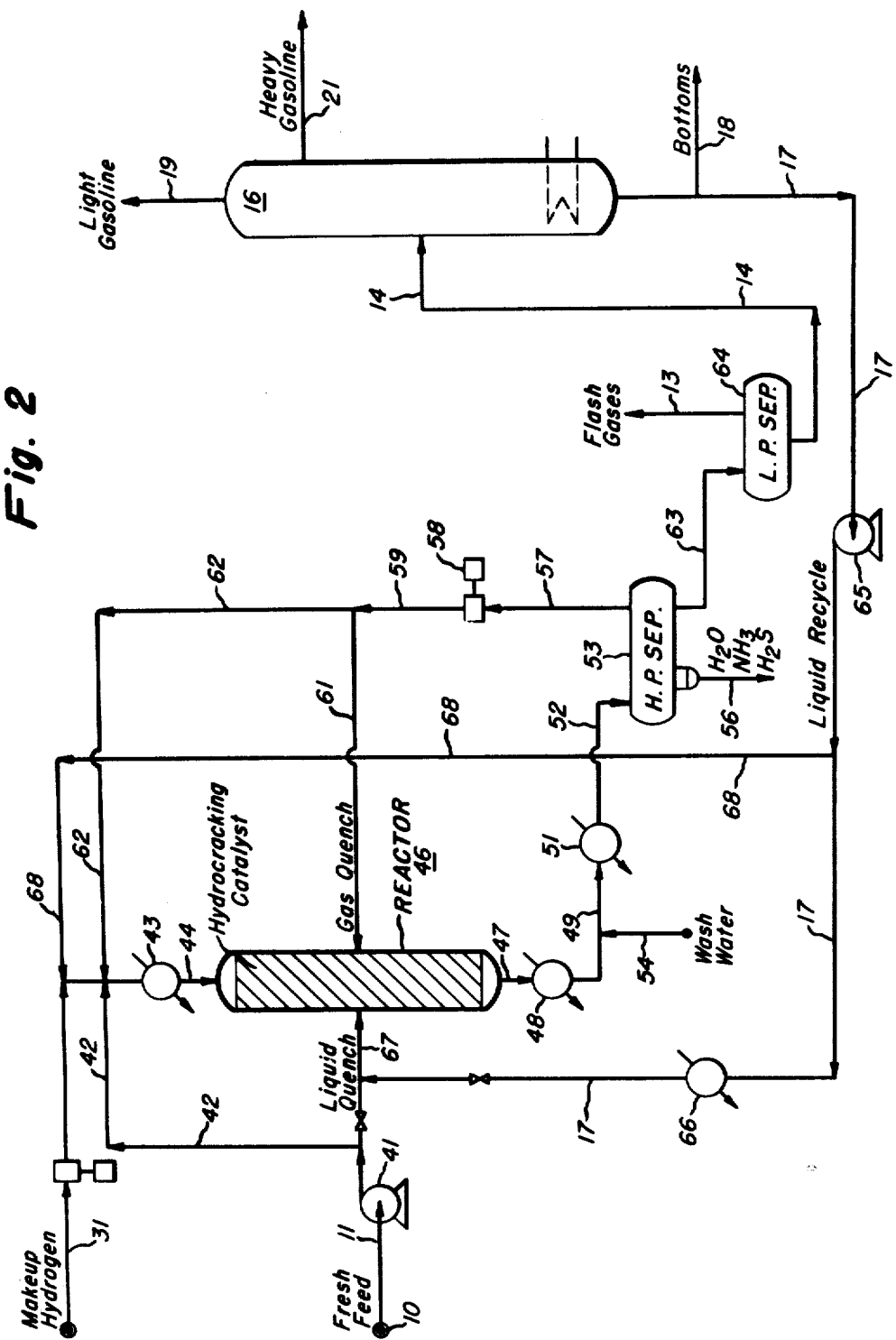
FIG. 2 is a simplified flow diagram presenting in further detail a preferred arrangement of the hydrocracking process of the invention.

Turning now to FIG. 2 which is a simplified flow diagram of a preferred embodiment of the hydrocracking section of the invention, light catalytic cycle oil fresh feed from source 10 is passed via line 11 and pumped by feed pump 41 through feed line 42, feed preheat exchanger 43 and line 44 into the upper section of hydrocracking reactor 46. The temperature of the feed to the reactor in line 44 is about 700° F. at the beginning of a run and is gradually increased (about 0.1° F. per day) as the run progresses in order to compensate for the gradual decline in the activity of the hydrocracking catalyst. The hydrocracking reaction is exothermic; therefore, the temperature of the reactants tends to increase as the reactants pass downward through the catalyst bed. In order to control the temperature rise and limit the maximum temperature within the reactor, a liquid quench stream is introduced into the catalyst bed at about the middle thereof. This liquid quench is fresh feed from feed line 42 and/or recycled oil from recycle line 17 described above and in more detail hereinafter. A hydrogen-rich gas quench stream, described below, is also introduced at about the same point in the reactor as the liquid quench; advantageously, the gas quench is introduced through the same inlet nozzle as the liquid quench stream. Effluent from the hydrocracking reactor 46 is passed via outlet line 47 through effluent cooler 48, thence through line 49, cooler 51, and line 52 into a high pressure gas-liquid separator 53. Wash water is introduced via line 54 into line 49, wherein it is mixed with the hydrocracker effluent. Upon passing through cooler 51 and line 52, it separates as an aqueous phase in high pressure separator 53. The wash water containing dissolved ammonia and H$_2$S is withdrawn from high pressure separator 53 via line 56. Gas which separates from the liquid in high pressure separator 53 is withdrawn from the separator via line 57, compressed by gas compressor 58, and passed via line 59 into gas quench line 61 and hydrogen recycle line 62, from whence it is passed with the fresh feed into feed preheater 43.

Liquid hydrocarbons are withdrawn from the high pressure gas-liquid separator 53 and passed via line 63 into a low-pressure gas-liquid separator 64. The gas phase from the lower-pressure separator, comprising primarily light hydrocarbons and hydrogen, is withdrawn via line 13 as flash gases which are conveniently used as fuel gas. The liquid hydrocarbon layer from the low pressure separator 64 is withdrawn and the hydrocarbons are passed via line 14 to the distillation column 16 for fractionation into light gasoline, heavy gasoline, and bottoms fractions. The bottoms fraction is withdrawn from the distillation column 16 and recycled via line 17 by recycle pump 65, one portion through heat exchanger 66 into the hydrocracking reactor 46 via liquid quench line 67 and another portion passed via line 68 into the feed preheat exchanger 43 in admixture with fresh feed and hydrogen.

Light hydrocracked gasoline distilled overhead in the distillation column 16 is withdrawn via line 19. A heavy gasoline side stream is withdrawn from the fractionator 16 via line 21 for use as hydroformer feed as described above and shown in FIG. 1. While one distillation column has been shown for separation of the hydrocracked product, other satisfactory recovery systems will be apparent to those skilled in the art and are deemed to be within the scope of this invention.

It is to be understood that the following examples are for the purpose of illustration only and are not to be regarded as a limitation of the present invention.

EXAMPLE I

To show typical results from conventional hydrocracking, a feed blend of 70 volume percent light catalytic cycle oil from catalytic cracking and 30 volume percent of light virgin gas oil was hydrocracked in two conventional two-stage hydrocracking processes. Sulfur and nitrogen compounds were removed from the oil in the first stage and hydrocracking was the predominant reaction in the second stage. The feed had the characteristics shown in Table II.

TABLE II

| | |
|---|---|
| Gravity, °API | 28.2 |
| Sulphur, wt.% | 0.35 |
| Nitrogen, ppm by wt. | 128 |
| Type Analysis, wt.% | |
| paraffins + naphthenes | 52.0 |

TABLE II-continued

| | |
|---|---|
| olefins | 8.0 |
| aromatics | 40.0 |
| ASTM distillation, ° F. | |
| IBP | 399 |
| 10% | 475 |
| 30% | 510 |
| 50% | 535 |
| 70% | 564 |
| 90% | 608 |
| EPB | 649 |

The operating conditions of each first stage included a pressure of about 1200 psig, a temperature of 550° to 700° F., a LHSV of about 3.0 volumes of feedstock per hour per volume of catalyst (Vol./Hr./Vol.), and a hydrogen recycle rate of about 4,000 to 5,000 SCFB. Hydrogen consumption was about 450 to 550 SCFB. The first-stage product contained only about 0.2 ppm of nitrogen and 60 to 90 ppm of sulfur.

The second stages were operated at a pressure of about 1200 psig, a temperature in the range of about 575° to 675° F., a LHSV of about 1 Vol./Hr./Vol., a hydrogen recycle rate of about 8,000 to 10,000 SCFB, and a product ASTM final boiling point (EBP) of about 360° F. with recycle to the second stage of material boiling above about 360° F.

The products from the two conventional hydrocracking processes had the yields and properties presented in Table III.

TABLE III

| Component | Yield, Wt.% |
|---|---|
| Hydrogen (consumption) | 3.2–3.5 |
| C$_4$ and lighter | 15.0–16.1 |
| Light gasoline | 24.0–26.2 |
| Heavy gasoline | 62.0–64.2 |

| Gasoline Properties | Heavy Gasoline | Light Gasoline |
|---|---|---|
| Gravity, °API | 49.6–51.7 | 80.5–83.3 |
| ASTM boiling range, °F. | 180–215 to 360 | 86–95 to 175–183 |
| Research Octane, clear | 67–70 | 85–87 |
| Motor Octane, clear | 65–67 | 83–88 |
| Aromatics Content, Vol. % | 16–19 | 1–3 |

The activity decline rate of the second-stage catalyst was such that an increase of about 0.2° F. in the average reactor temperature would maintain conversion essentially constant. Experience has shown, however, that as the average reactor temperature approaches an upper limit of about 700° F., yield loss and rapid catalyst deactivation occur requiring shutdown to reactivate the catalyst.

EXAMPLE II

To demonstrate the advantages of using the above-described one-stage hydrocracking in the hydrocracking step, the same feed as described in Example I was hydrocracked in the presence of a catalyst comprising 2.5 weight percent CoO and 5 weight percent MoO$_3$ deposited on a co-catalytic support of silica-alumina cracking catalyst containing about 14 weight percent of the preferred ultrastable, large-pore crystalline aluminosilicate material. Operating conditions included an average reactor temperature in the range of 700° to 800° F., mostly 740° to 750° F., a pressure of 1,300 psig, a hydrogen recycle rate of 9,000 to 12,000 SCFB, a LHSV of about 1 and a throughput ratio (fresh feed plus recycle/fresh feed) of about 1.3. The yields and quality of the products were as shown in Table IV.

TABLE IV

| Component | Yield, Wt.% | |
|---|---|---|
| Hydrogen (consumption) | 3.1 | |
| C₄ and lighter | 19.3 | |
| Light gasoline | 27.7 | |
| Heavy gasoline | 56.1 | |
| Gasoline properties | Light Gasoline | Heavy Gasoline |
| Gravity, ° API | 80.3 | 46.8 |
| ASTM boiling range, °F. | 96 – 184 | 211 – 363 |
| Research Octane, clear | 85.0 | 80.8 |
| Motor Octane, clear | 81.8 | 74.4 |
| Aromatics content, Vol. % | — | 38.2 |
| Sulfur content, ppm | 26 | 2.6 |

Thus, it can be clearly seen from comparison of the above examples that the one-stage hydrocracking is more desirable than the two-stage processes for use in the hydrocracking step of the present invention.

EXAMPLE III

Three catalysts were prepared and were tested under hydrocracking conditions to demonstrate the relative performance of each. The preparation of these catalysts is discussed in the following paragraphs.

First, 200 grams of Linde Y-type aluminosilicate molecular sieves in the sodium form were slurried with a solution which had been prepared by dissolving 150 grams of ammonium chloride in 400 milliliters of distilled water. The resultant slurry was refluxed at atmospheric pressure for three hours, filtered, and washed with 1 liter of distilled water. Subsequently, the washed cake was filtered under a vacuum. Then the cake was slurried with an equal amount of the ammonium chloride solution. The resultant slurry was refluxed at atmospheric pressure for 2.5 hours and then filtered and washed as before. The resultant cake was slurried with a third equivalent amount of ammonium chloride solution and refluxed at atmospheric pressure for 0.5 hour. The slurry was then held overnight and subsequently refluxed at atmospheric pressure for 2 hours, after which it was filtered. Then the cake was slurried with five 1.5-liter portions of distilled water to remove excess ammonium chloride. It was found after the five washings that no precipitate was formed when silver nitrate was added to the filtrate. The washed material was dried on a Buchner funnel to a water content of 48 weight percent.

A diluted silica-alumina sol was prepared. To 400 milliliters of distilled water were added 1,000 grams of a high-alumina silica-alumina sol prepared by the American Cyanamid Company. The resultant mixture was stirred for 0.5 hour and a 10 percent ammonium hydroxide solution was added drop-wise to adjust the pH to a level between 6.5 and 7.0. After the pH was adjusted to the desired level, the stirring was continued while 25.5 grams of the above-treated aluminosilicate material were slowly added. When the aluminosilicate material was mixed throughout the sol, the resultant mixture was placed in a high-speed blender and homogenized. Subsequently, the mixture was transferred to a shallow tray or dish and dried in a current of warm air. When the water content of the dried material had been reduced to a level between about 40 to about 45 weight percent, the dried material was ground or pulverized to a fine powder. This fine powder constituted a co-catalytic material comprising Linde Y-type aluminosilicate molecular sieves in the $NH_4+$ form suspended in a porous matrix of silica-alumina. This dried powder had a volatile or water content of 40 weight percent.

This aluminosilicate-containing silica-alumina catalyst was then impregnated with cobalt and molybdenum. First, 120 grams of the dried material (dry basis) were impregnated with 8.0 grams of $(NH_4)_6Mo_7O_{24}.4H_2O$, and the resultant material was dried overnight. Then 7.8 grams of $Co(CHO_2)_2.2H_2O$ were dissolved in 180 cubic centimeters of water and the pH was adjusted to 6.5. This solution was then impregnated into the dried material by adding it in two portions. Air drying of the material at ambient temperature was carried out between impregnations.

The impregnated material was placed in a furnace and slowly heated to 350° C. in static air for period of 4 hours. The impregnated material was then held for 16 hours at a temperature between 350° and 400° C. in static air. The temperature was then raised to 500° C. and held at this temperature for 2 hours.

A 6.5-gram portion of this material, which had been heated in air, i.e., calcined, was placed in the reactor of a bench-scale test unit. The reactor was fabricated from ⅜-inch I.D. stainless steel tubing. A ⅛-inch O.D. co-axial thermowell extended along the length of the reactor. This reactor and its associated bench-scale test unit were employed in the hydrocracking tests performed with the catalysts prepared in this discussion. Each charge of catalyst varied between 8 and 10 cubic centimeters of material. This resulted in a catalyst bed which varied from 6 to 7 inches in length. Conventional bench-scale product-recovery equipment was employed.

The calcined material in the reactor was treated with flowing hydrogen (0.6 to 0.8 standard cubic feet per hour) for 1 hour at 180° F. Then the material was subjected to the sequence of temperatures reported in Table V.

TABLE V

| Time, Hours | Temperature, ° F. |
|---|---|
| 1 | 250 |
| 0.5 | 300 |
| 0.5 | 400 |
| 1 | 500 |
| 12 | 700 |
| 2 | 850 |

The hydrogen pressure was raised to 1250 psig and the heated material was cooled to a temperature of 570° F. This material was Catalyst A.

Catalyst A comprised the oxides of cobalt and molybdenum on an acidic cracking component comprising decationized Linde Y-type crystalline zeolitic aluminosilicate molecular sieves dispersed in a porous matrix of high-alumina silica-alumina. The preparation was designed to produce a catalyst which contained approximately 2.5 weight percent cobalt oxide and approximately 5 weight percent molybdenum trioxide on an acidic cracking component made up of approximately 10 weight percent decationized molecular sieves dispersed in the porous matrix of silica-alumina.

A second portion of the above impregnated material, which had not received the calcination treatment, was dried in static air at 320° C. for 16 hours. A 5.55-gram portion of this material, which had been dried at 320° C., was placed in a bench-scale reactor, the description of which is presented above. This material was then subjected to flowing hydrogen (0.6 to 0.8 standard cubic feet per hour) at a hydrogen pressure of 1250 psig and a temperature of 600° F. prior to the introduction of oil. In this case, the Linde Y-type molecular sieves at the ammonium form were converted to sieves in the hydrogen form. The treatment was not designed to cause decationization of the sieves. This material was designated as Catalyst B.

A 15.0-gram portion of the ultrastable, large-pore crystalline aluminosilicate material Z-14US, manufactured by the Davision subsidiary of W. R. Grace & Co., was slurried with 100 milliliters of distilled water. This slurry was then added to 1,000 grams of a high-alumina silica-alumina sol or hydrogel (12 percent solids) prepared by the American Cyanamid Company. The resultant mixture was diluted with 500 milliliters of distilled water and homogenized in a high-speed blender. The mixture was air dried at ambient temperature and pulverized. Then the pulverized material was dried overnight at 60° C. in static air. A 60-gram portion of this pulverized material (50 grams on a volatile-free basis) was then added to a solution which had been prepared by dissolving 4.0 grams of $(NH_4)_6Mo_7O_{24}.4H_2O$ in 60 milliliters of water and adjusting the pH to a value between 6.0 and 6.5. The mixture was dried in air at ambient temperature and was then treated with a solution which had been prepared by dissolving 3.2 grams of $Co(CHO_2)_2.2H_2O$ in 70 milliliters of distilled water. The resultant impregnated material was calcined in static air at 1,000° F. for 2 hours and the cooled. A 6.5-gram portion of the latter calcined material was charged into a bench-scale reactor, similar to the one described above. The material in the reactor in the bench-scale unit was pretreated in flowing hydrogen (0.6 to 0.8 standard cubic feet per hour) at a a pressure of 1250 psig and a temperature of 700° F. for 2 hours. The resultant material was designated as Catalyst C.

Each of the catalysts prepared as described above was tested in bench-scale equipment, a brief description of which has been presented above. The hydrocarbon feedstock employed in these tests was the same as that used in Examples I and II.

The operating conditions for each of these tests are presented in Table VI.

TABLE VI

| | |
|---|---|
| Hydrogen partial pressure, psig | 1200 |
| Liquid hourly space velocity (Vol.oil/hr./vol.cat.) | 1.0 |
| Hydrogen flow rate, SCFB | 12,000 |
| Through-put ratio | 1.3 |

Figure 3:
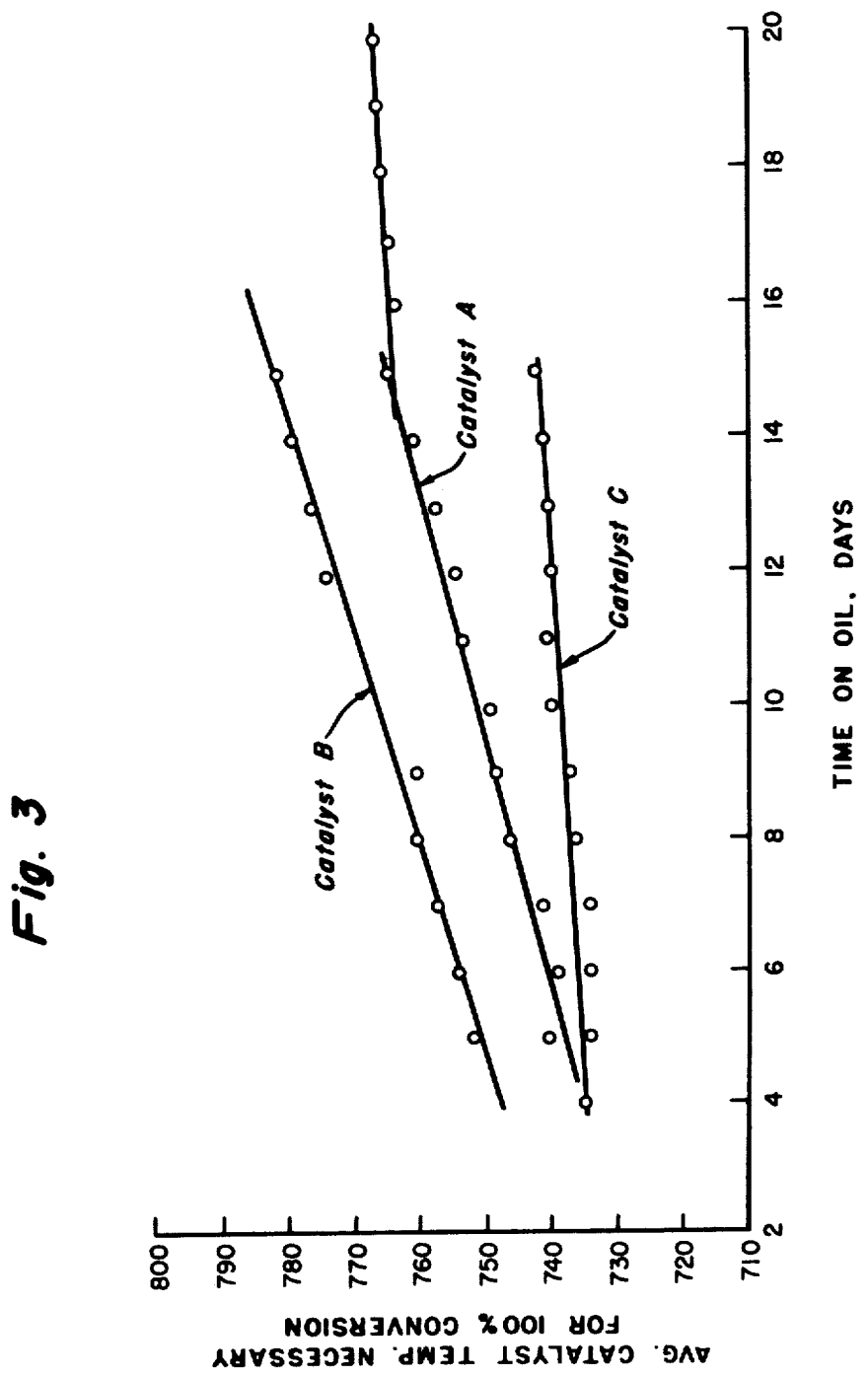
FIG. 3 presents activity data obtained with several catalysts when each is employed to hydrocrack a petroleum hydrocarbon feedstock.

The results of these tests are presented in FIG. 3. In this figure is shown the variation of the average catalyst temperature necessary for 100 percent conversion with time on oil. Therefore, one can easily ascertain the relative activity and activity decline for each of these catalysts when hydrocracking the designated hydrocarbon feedstock. The more active that a particular catalyst is, the lower is the average catalyst temperature that it needs to provide 100 percent conversion of the feedstock. Furthermore, the greater the activity decline rate that a catalyst possesses, the steeper is the slope for line representing the average catalyst temperature of that catalyst.

These data show that the catalyst which provided the best catalyst activity and the best catalyst activity decline was Catalyst C. That is the catalyst which has the composition as provided by the present invention, i.e., a composition comprising the oxides of cobalt and molybdenum on a co-catalytic acidic cracking component comprising preferred ultrastable, large-pore crystalline aluminosilicsate material dispersed in a porous matrix of silica-alumina. These data indicate that the catalyst of the present invention can be used efficiently to hydrocrack petroleum hydrocarbons for periods of time in excess of 4 months without regeneration.

From the above description and associated figures, it can be seen clearly that a hydrocracking process employing the catalytic composition of the present invention provides a superior hydrocracking process, which can be used according to the present invention to provide unleaded high-octane-number blending components for motor fuels.

EXAMPLE IV

The stability toward wetting of each of the selected aluminosilicate materials was investigated. This stability may be defined as that ability of a particular aluminosilicate material to retain surface area after contact with water or water vapor. In this example, a sample of each of the three specified aluminosilicate materials was subjected to a number of consecutive cycles, each cycle consisting of a wetting and a drying, and the loss of surface area resulting from such procedure was ascertained for each by means of nitrogen adsorption. Nitrogen adsorption is an experimental measurement that is proportional to surface area.

The aluminosilicate materials that were studied were: (1) ammonium-exchanged Y-type molecular sieves, designated hereinafter as Aluminosilicate D; (2) ammonium-exchanged Y-type molecular sieves that had been heated in flowing air at 600° C. and a rate of 2 standard cubic feet of air per hour for 6 hours, designated hereinafter as Aluminosilicate E; and (3) ultrastable, large-pore crystalline aluminosilicate material, designated hereinafter as Aluminosiliate F. Each of these aluminosilicate materials received the treatment described hereinbelow.

The aluminosilicate material, in a pulverized form, was compressed at a pressure of 5 tons per square inch in a 1¼-inch diameter steel die to form a thin self-supporting wafer. Each wafer typically weighed 0.30 gram.

The water was suspended subsequently from a quartz-helix balance in a vacuum system comprising conventional high-vacuum equipment which produces a $10^{-4}$ Torr pressure and was dried by evacuation for 1 hour at 500° C. The dried material was cooled to $-196°$ C. and the extent of absorption of nitrogen was measured gravimetrically at several pressures between 10 and 200 Torr. Then the wafer was warmed to room temperature. The balance was evacuated for 15 minutes to remove the nitrogen. Subsequently, the wafer was exposed to water vapor at 16-18 Torr for about one hour until the wafer was essentially saturated with absorbed water. Then the wafer was heated to 500° C. over a period of about 25 minutes. It was dried by evacuation for 1 hour at 500° C. and cooled. The adsorption of nitrogen was measured again at $-196°$ C.

The above wet-dry cycle was repeated at least one more time. After the initial drying for 1 hour at 500° C., Aluminosilicate D comprised the hydrogen-form of Y-type molecular sieves, partially decationized, Aluminosilicate E comprised decationized Y-type molecular sieves, and Aluminosilicate F comprised a soda form of the ultrastable, large-pore crystalline aluminosilicate material employed in the catalytic composition of the present invention. Aluminosilicate D and Aluminosilicate E each contained 1.94 weight percent sodium; Aluminosilicate F, 2.15 weight percent sodium.

Figure 4:
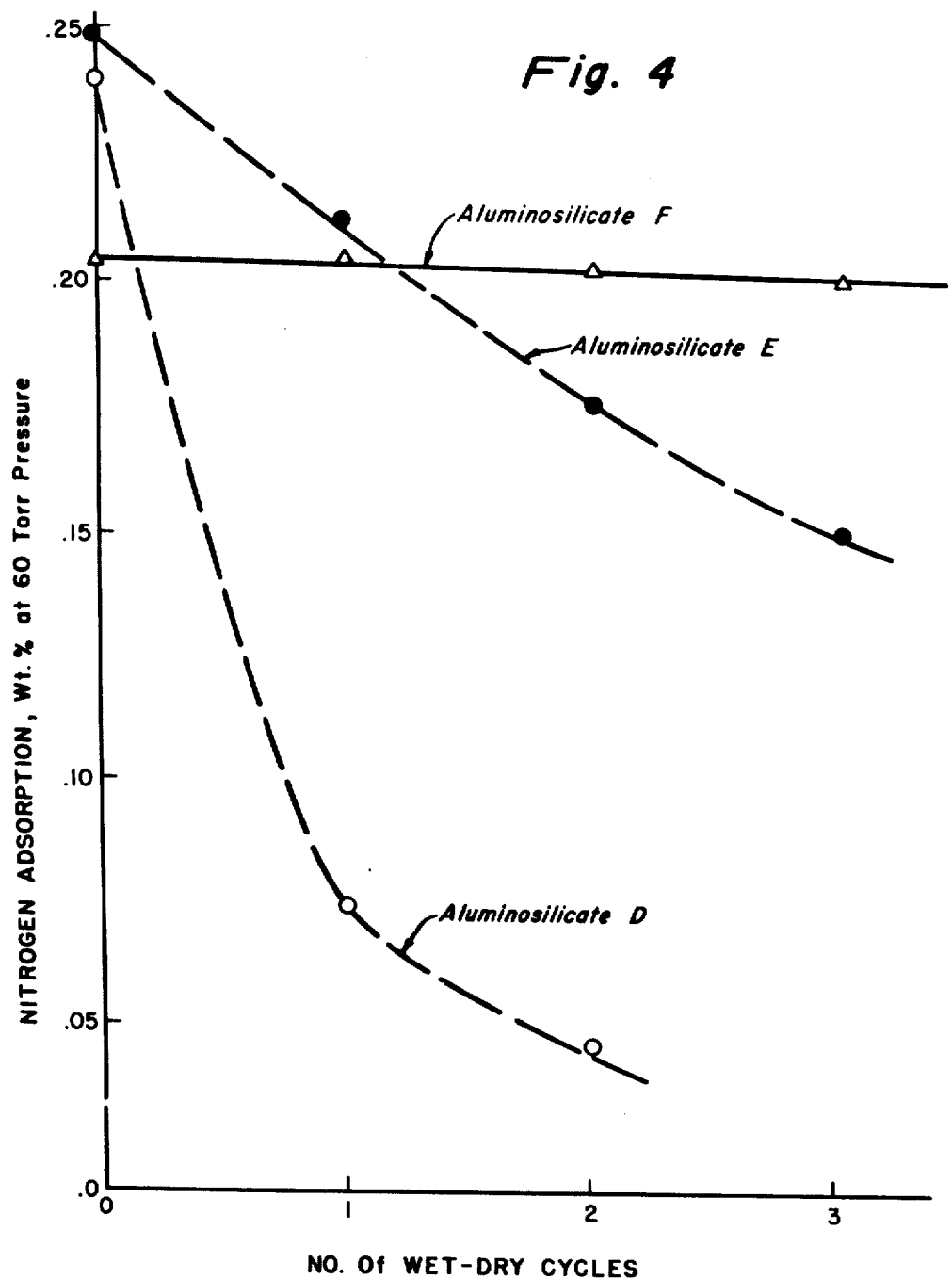
FIG. 4 presents stability data for selected aluminosilicate materials.

The effect of the above treatment on each of these aluminosilicate materials is presented in FIG. 4. As a result of the treatment both Aluminosilicate D and Aluminosilicate E experienced a greater loss in surface area then did the ultrastable, large-pore crystalline aluminosilicate material. It is seen that for each of Aluminosilicate D and Aluminosilicate E, the loss of surface area, proportional to the loss of nitrogen adsorption, does not occur only on the initial rewetting, but is apparently repeated on each subsequent rewetting. These results indicate that Aluminosilicate F, the soda form of ultrastable, large-pore crystalline aluminosilicate material of the catalytic composition of the present invention, is quite different from Aluminosilicate D, comprising hydrogen-form Y-type molecular sieves, and Aluminosilicate E, comprising decationzed Y-type molecular sieves, at least as far as stability to wetting is concerned. Aluminosilicate F has a much greater stability.

EXAMPLE V

The infrared spectra of selected aluminosilicate materials were obtained and compared in this example.

Wafers of the aluminosilicate materials were prepared for this study. These wafers were prepared by pressing approximately 0.15 gram of the powdered particular aluminosilicate material in a cylindrical steel die, 1¼ inches in diameter, under a pressure of 13,000 psi. The wafers were trimmed to fit a Vycor sample holder, each sample being about 4 square centimeters in area and weighing 0.08 to 0.10 gram. This size sample gave a "thickness" of 20 to 25 milligrams per square centimeter in the infrared beam. The infrared cell permitted heating and drying the samples under vacuum. Spectra were recorded using a Beckman IR-9 spectrometer in single beam operation. Conventional procedures known to those skilled in the art were followed in treating samples and recording spectra, except that wider-than-normal slit widths were necessary. These slit widths, in general, ranged from 2.0 to 3.5 millimeters in the region above 3400 cm$^{-1}$. Samples were dried by evacuation below 10$^{-4}$ Torr for 1 hour at the indicated temperatures and were cooled to about 40° C. before spectra were recorded.

Three types of aluminosilicate material were studied: (1) decationized Y-type aluminosilicate material; (2) a soda form of preferred ultrastable, large-pore crystalline aluminosilicate material; and (3) preferred ultrastable, large-pore crystalline aluminosilicate material.

The decationized Y-type aluminosilicate material was prepared by cation-exchanging Y-type aluminosilicate material with ammonium ions and heating to subsequently drive off the ammonia and hydrogen ions. The treated material had a sodium content of 1.94 percent sodium. This material was precalcined in oxygen (200 Torr) in an infrared cell and dried by evacuation. Samples of this material were dried by evacuation at 500° and at 600° C., respectively, and the infrared spectra were obtained therefor.

The soda form of the ultrastable, large-pore crystalline aluminosilicate material was found to contain 3.0 percent sodium. Samples of this material were dried by evacuation at 600° and at 800° C., respectively, and the infrared spectra were obtained therefor.

A portion of the above soda form of the ultrastable, large-pore crystalline aluminosilicate material was treated to lower the sodium content to a level below 1 weight percent sodium. This treatment comprised exchanging the soda form with an ammonium chloride solution. The exchanged material was then calcined in air at a temperature of about 550° C. for about 3 hours. The sodium content of the treated materials was found to be 0.84 weight percent sodium. Samples of this material were dried at 600° and 800° C., respectively; and infrared spectra were obtained for each sample.

Figure 5:
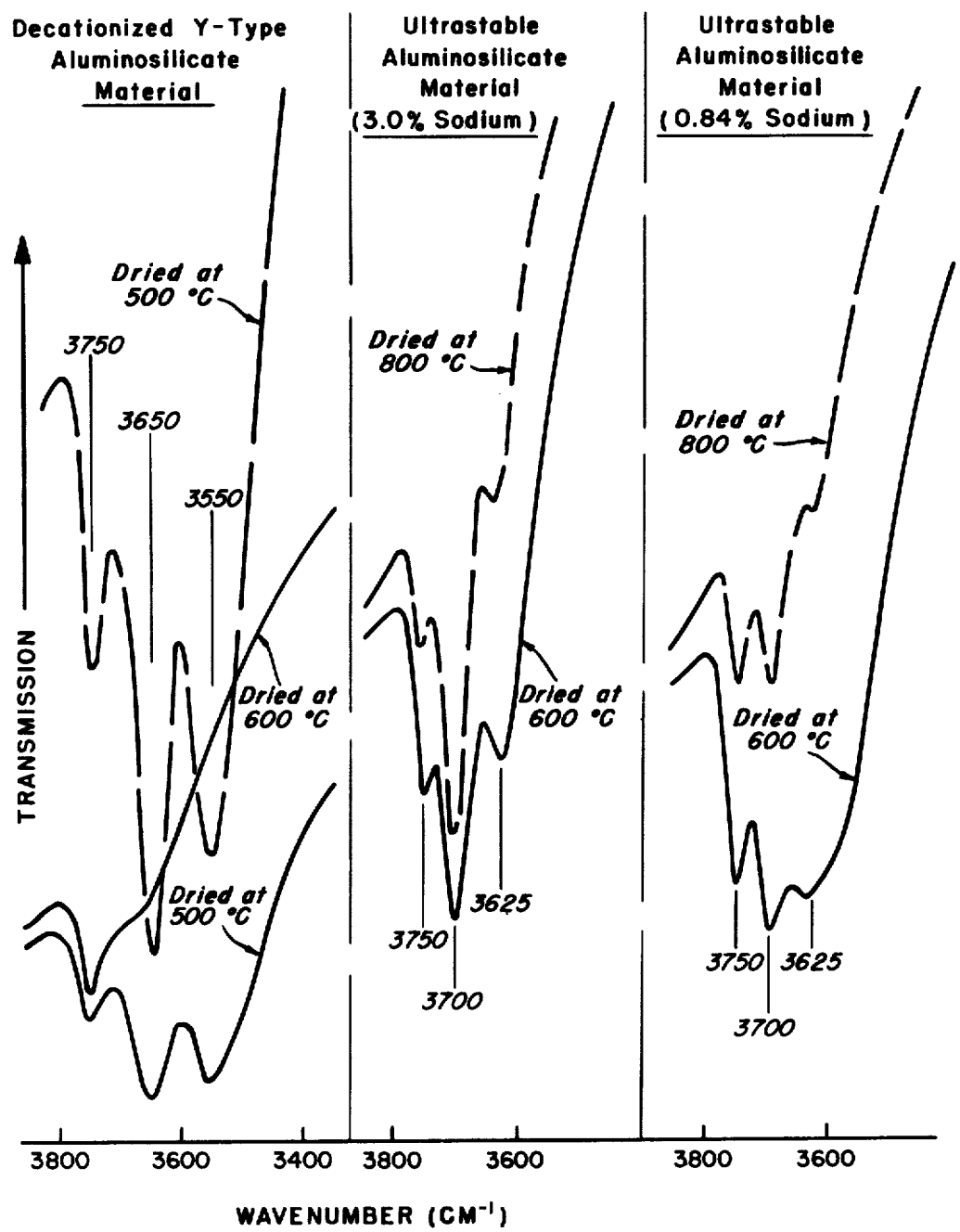
FIG. 5 presents infrared spectra obtained with selected aluminosilicate materials.

The results of the above-described infrared studies are presented in FIG. 5.

In the case of unstable, decationized Y-type aluminosilicate material, infrared bands appear near 3550 cm$^{-1}$, near 3650 cm$^{-1}$, and near 3750 cm$^{-1}$, when the material has been dried at 500° C. However, the 3650 cm$^{-1}$ band and 3550 cm$^{-1}$ band are almost entirely removed when the material is dried under vacuum at 600° C. Two spectra were obtained for material dried at 500° C. A slit width of 2.5 millimeters was employed for the study of the sample producing the spectrum represented by the dashed line. A slit width of 1.3 millimeters was employed to obtain the spectrumrepresented by the solid line. In addition, the latter slit width was employed for the study of the sample dried at 600° C.

In the case of the soda form of the ultrastable, large-pore crystalline aluminosilicate material, the 3750 cm$^{-1}$ band was present. In addition, infrared bands near 3700 cm$^{-1}$ and near 3625 cm$^{-1}$ were obtained when heated in vacuum at 600° C. or at 800° C. A slit width of 3.0 millimeters was employed when studying the soda form of the ultrastable, large-pore crystalline aluminosilicate material.

In the case of the low-sodium, ultrastable aluminosilicate material, that is, the ultrastable, large-pore crystalline aluminosiliate material that is employed in the catalyst that is used in the present invention, the same infrared bands near 3750 cm$^{-1}$, 3700 cm$^{-1}$, and 3625 cm$^{-1}$ appear. However, these peaks in the spectra for the low sodium material are not as pronounced as the peaks in spectra for the soda form of the ultrastable material. Again 2 slit width of 3.0 millimeters was employed.

The results of these infrared studies show that each of the samples tested provided an infrared band near 3750 cm$^{-1}$. This band occurs in the spectrum of all synthetic faujasites. This band may be expressed as 3745 ± 5 cm$^{-1}$. However, the band near 3700 cm$^{-1}$ (3695 ± 5 cm$^{-1}$) and the band near 3625 cm$^{-1}$ (± 10 cm$^{-1}$) occur in the spectra of both the soda form and the low-sodium ultrastable, large-pore crystalline aluminosilicate material.

No spectra of decationized Y-type aluminosilicate material that has been published to date show a band near 3700 cm$^{-1}$, nor is such a band mentioned in connection with such spectra. Characteristically, for Y-type aluminosilicates, in addition to the band at 3750 cm$^{-1}$, bands are reported near 3650 cm$^{-1}$ and 3550 cm$^{-1}$. These bands are most intense on hydrogen-form Y-type aluminosilicate material. Such bands are almost entirely removed when the material is heated under vacuum at 600° C.

While bands near 3700 cm$^{-1}$ and near 3625 cm$^{-1}$ are not shown herein for the decationized Y-type aluminosilicate material, it is possible that such bands may be present if that material were to be subjected previously to certain treatments. In view of this, it is suggested that the preferred ultrastable, large-pore crystalline aluminosiliate material of the catalyst employed in the present invention be identified by more than just its infrared spectrum. It is suggested further that the identification also include the cubic unit cell dimension of the material.

EXAMPLE VI

In this example, the cubic unit cell dimension of the ultrastable, large-pore crystalline aluminosilicate material employed in the catalyst of this invention was measured by X-ray diffraction techniques. The measurements were obtained with a General Electric XRD-5 diffractometer employing nickel-filtered copper Kd radiation. Each sample was mixed with about 10 percent by weight sodium chloride and scanned over the angular range of 44.5° to 57.5° 2 $\theta$ at 0.08° per minute. The 1.994 A and 1.628 A sodium chloride reflections were used as standards and the lattice parameters were determined as the average of six aluminosilicate reflections whose Miller indicies gave these sums: 164, 168, 187, 195, 200, and 211. The samples of ultrastable, large-pore crystalline aluminosilicate material provided cubic unit cell dimensions of 24.52 Angstroms.

EXAMPLE VII

A critical feature of most every hydrocarbon conversion catalyst is its ability to be regenerated. A catalyst that cannot be regenerated successfully has lost appreciable value. A catalyst that can be regenerated only under severe conditions may be deleteriously affected by such conditions, if they are not controlled carefully; or the catalyst may receive a gradual reduction in its useful life as a result of the severity of the conditions required for its regeneration and such gradual reduction may be relatively rapid.

A recent patent, U.S. Pat. No. 3,197,397, suggests that catalysts containing molecular sieves and an associated Group VIII metal should be regenerated at temperatures above 900° F. for effective regeneration. The patent stated that damage to such a catalyst resulting from the water vapor that is generated by the combustion of hydrocarbonaceous deposits on the catalyst and/or the water vapor present in the regeneration gases is greatly reduced, if the entire combustion-regeneration is performed at temperatures in excess of 900° F. However, it is believed that this severity could lead to unnecessary chaotic results, if such regeneration were not carefully controlled. The patent alleges that the conventional regeneration procedure for a hydrocracking catalyst wherein combustion is carried out at temperatures within the range of 500° to 900° F., when employed on a catalyst containing molecular sieves and a Group VIII metal, restores the catalyst to an activity level that is much lower than that of the fresh catalyst, i.e., the catalyst requires a temperature that is 50° to 150° F. higher than that required for the fresh catalyst to provide equivalent conversions.

An important characteristic of the catalytic composition of the present invention is its ability to be regenerated at temperature that does not exceed 900° F. The term "regenerated" is used herein to include the restoration of the activity of the catalytic composition to substantially its original value. In other words, the temperature that is needed to provide a specified conversion for the regenerated catalyst is not much higher than that required by the fresh catalyst to attain the same conversion. It is believed that the presence of the ultrastable, large-pore crystalline aluminosilicate material is a factor for the ability of the catalytic composition to be substantially restored in activity by a treatment that does not require temperatures in excess of 900° F. Typical regenerations of catalysts containing aluminosilicate materials are carried out in temperatures in excess of 900° F. Therefore, it is believed that this unusual characteristic of the catalytic composition of the present invention provides certain advantages over prior art characteristics and regenerations of such catalysts. The ability to operate at the lower temperatures certainly will be a factor in the design considerations of a commercial unit employing the process and the catalytic composition of the present invention. The reduced temperatures will permit reductions in the volume of gas flow, which in turn will allow a minimal size of both piping and vessels, compressors, heat exchangers, and the like.

The regenerability of the catalytic composition of the present invention was considered in and demonstrated by the following tests.

The catalyst that was employed in these tests was a typical embodiment of the catalyst of the present invention and contained 2.46 weight percent CoO, 9.77 weight percent MoO$_3$, based upon the weight of the catalyst, and 36.0 weight percent preferred ultrastable, large-pore crystalline aluminosilicate material, based upon the weight of the support. The remainder of the catalyst consisted of a low-alumina silica-alumina cracking catalyst. The apparent bulk density of the catalyst was 44.5 pounds per cubic foot.

A quantity of this catalyst (794 gms.) was artifically deactivated by subjecting it to 18 days of deactivation operation with a liquid hydrocarbon feed; but no fresh or recycle hydrogen-containing gas was employed. The catalyst-bed length was 56¼ inches and the reactor-preheat-section length was 21⅝ inches. This deactivation treatment was accomplished at a temperature within the range of about 670° to about 770° F. and at a total pressure of 200 psig. Three different feedstocks were employed during the deactivation treatment; a light virgin gas oil (LVGO); a heavy catalytic cycle oil (HCCO); and a light catalytic cycle oil (LCCO). Their properties, as well as those of a blend of 70 volume percent LCCO and 30 volume percent LVGO employed hereinafter, are summarized in Table VII hereinbelow.

TABLE VII

| | Feed Properties | | | |
|---|---|---|---|---|
| Feed Type | LVGO | HCCO | LCCO | 70-30 Blend LCCO/LVGO |
| Gravity, ° API | 34.5 | 17.0 | 25.1 | 27.7 |
| Refractive Index, n20$_D$ | 1.4720 | — | 1.5149 | 1.5020 |
| ASTM Distillation, ° F. | | | | |
| IBP | 422 | 413 | 384 | 408 |
| 10% | 466 | 594 | 468 | 473 |
| 30% | 489 | 644 | 500 | 506 |
| 50% | 508 | 672 | 525 | 532 |
| 70% | 535 | 704 | 560 | 562 |
| 90% | 587 | 750 | 604 | 608 |
| Max. | 643 | — | 640 | 648 |
| Chemical Composition | | | | |
| Hydrogen, wt.% | 13.24 | 10.55 | 11.33 | 11.91 |
| Sulfur, wt.% | 0.077 | 0.77 | 0.286 | 0.260 |
| Nitrogen, ppm | 31 | 736 | 197 | 160 |
| Molecular Weight | 220 | 249 | 199 | 205 |
| Molecular Type | | | | |
| Paraffins | 26.6 | 16.9 | 19.6 | 25.3 |
| Naphthenes | 55.2 | 34.3 | 30.0 | 34.3 |
| Aromatics | 18.2 | 48.8 | 50.4 | 40.4 |

At periodic intervals during the course of this deactivation treatment, the deactivation treatment was stopped and activity tests were made to determine the progress of deactivation.

The deactivation treatment, activity testing, and regeneration operation all were carried out in an automated small-scale pilot plant unit which employed a reactor that was fabricated from 1¼ inch schedule 80 stainless steel pipe. The reactor was 7½ feet in length and had an internal diameter of 1.278 inches. A co-axial thermowell, having an outside diameter of 3/16 inch, extended through the entire length of the catalyst bed. The top of the reactor contained a preheat section of ⅛-inch alumina balls. This preheat section was followed by the catalyst bed, which was supported by 0.5 foot of ⅛-inch alunina balls. Catalyst samples removed during the course of the test were used for analyses. The catalyst was charged to the reactor in the form of ⅛ × 150 inch pellets.

During activity testing, recycle gas was combined with make-up hydrogen and the resulting gas mixture was preheated prior to being mixed with hydrocarbon material being charged to the unit. The hydrocarbon-gas mixture was passed through another preheater to raise the temperature of the material to be charged to the unit to a level of approximately 300° to 400° F. The mixture was introduced into the reactor at a point 6 inches below the top where it was preheated additionally to attain reaction temperatures. Then the heated hydrogen-hydrocarbon mixture was passed through the catalyst bed. The effluent from the reactor was cooled to about 70° F, and liquid was separated from gas in a high-pressure separator at a pressure of 1,300 psig. The liquid stream from the high-pressure separator was then passed to a low-pressure separator, which was maintained at 10 psig. Light ends, produced by the throttling of the high-pressure-separator liquid, were separated from the remaining material in the low-pressure separator. When unit tests were made, liquid product was cooled in a product receiver and the gas from the low-pressure separator was passed to a heavy-ends condensor to remove $C_5$-hydrocarbons and $C_6$-hydrocarbons. Condensed fractions were collected with the liquid in the product receiver while the non-condensables were saturated, metered, and vented.

The catalyst activity was determined by finding the temperature necessary to provide 77 weight percent conversion of the fresh feed to products that boil below 360° F. The total conversion combining both the gas and liquid effluent streams was determined by periodic weight balances, the gas stream and the liquid stream being analyzed by Gas-Chromatographic techniques. The activity tests were conducted at the nominal conditions presented in Table VIII hereinbelow.

TABLE VIII

| Activity Test Operating Conditions | |
|---|---|
| Total Pressure, psig | 1300 |
| Weight Hourly Space Velocity (gms.oil/hr./gms,cat.) | 1.63 |
| Liquid Hourly Space Velocity (vol.oil/hr./vol.cat.) | 1.30 |
| Through-Put Ratio | 1.0 |
| Recycle Gas Rate, SCFB | 10,300 |

The LVGO was employed as the feedstock in the activity tests that were conducted to determine the amount of deactivation.

After the 18 days of deactivation operation and 42 days of associated activity testing, the catalyst was found to contain about 32 weight percent coke, based upon the weight of the coke-free catalyst. Deactivation of the catalyst to 31 percent of its initial activity had occurred.

Approximately one-half of the deactivated catalyst (386 gms. on a fresh catalyst basis) was charged to the unit for subsequent regeneration. The catalyst bed length was 28⅜ inches; the reactor preheat length, 44⅝ inches. The regeneration was initiated by heating the deactivated catalyst to 600° F. in flowing nitrogen at a pressure of 200 psig and a nitrogen flow rate of about 10.5 standard cubic feet per hour per pound of fresh catalyst. This heating of the catalyst was performed in about 2 days. Then air was introduced into the system to provide an oxygen concentration of about 0.8 mole percent. As coke-burn was initiated, gas recycle was begun, and the oxygen concentration was increased from 0.8 to a value within the range of about 1.2 to about 1.4 mole percent. During the next 20 hours, the inlet temperature, which was initially at 595° F., was increased to about 760° F. The temperature of the flame front in the catalyst bed was about 130° to about 150° F. higher than the inlet temperature. The oxygen concentration was maintained at a value within the range of about 1.2 to about 1.4 mole percent. At the 760° F. inlet temperature, the maximum temperature of the flame front was about 900° F. This coke burning operation was continued for about 55 hours, during which time the single flame front moved through about one-half of the catalyst bed. Mechanical problems with the recycle-gas compressor occurred at this time and these problems resulted in a somewhat higher than normal oxygen concentration at times thereafter. After about 78.5 hours from the start of the regeneration, recycle was stopped and once-through nitrogen plug air was employed to provide an oxygen concentration within the range of about 1.4 to about 2 mole percent. This was continued until no further burning was evident. No appreciable burning occurred at about 120 hours after the start of the regeneration.

Samples of the regenerated catalyst were obtained from the unit and the remainder of the catalyst (368 gms. on a fresh catalyst basis) was reloaded into the reactor for an activity determination. The catalyst-bed length was 25 inches and the length of the reactor preheat section was 23 inches. The activity studies were conducted for about 40 days; during the first 27 days, LVGO was used as hydrocarbon feed, and during the last 13 days, the blend was used as hydrocarbon feed. The results of this activity test are compared to the activity of the fresh catalyst and the deactivated catalyst in Table IX. Table IX summarizes only the data obtained with LVGO. The activity of the catalyst is expressed in terms of the temperature requirements for 77 percent conversion. The relative activity for each of the catalyst samples is also presented; the activity of the fresh catalyst was assigned a value of 1.0.

TABLE IX

| Catalyst | Temperature required for 77% conv., ° F. | Relative Activity |
|---|---|---|
| Fresh | 680 | 1.00 |
| Deactivated | 730 | 0.31 |
| Regenerated | 689 | 0.80 |

The samples of catalyst that had been removed from the catalyst prior to the activity test were subjected to various analyses. Briefly, these analyses showed: (1) the catalyst had lost no measurable cobalt or molybdenum; (2) the ultrastable, large-pore crystalline aluminosilicate material had shown no detectable loss in crystallinity; (3) the cubic unit cell dimension of the ultrastable, large-pore crystalline aluminosilicate material had undergone a small amount of shrinkage (approximately 0.08 A); and (4) the catalyst contained a coke level that varied within the range of about 0.87 to about 4.55 weight percent coke, the variation occurring throughout the length of the bed.

After the activity studies had been completed, a second regeneration was initiated. Once-through nitrogen was passed through the test system at a rate of about 10.5 standard cubic feet per hour per pound of catalyst (SCFHPC) and the reactor was heated to a temperature of about 600° F. The test system was maintained under these conditions overnight. Thereafter air was introduced into the system to provide an oxygen concentration of about 0.8 mole percent. Unit pressure was maintained at 200 psig. Coke-burn was initiated at the 0.8 mole percent oxygen level and an inlet temperature of 595° F. The oxygen concentration was increased to about 1.3 mole percent oxygen and the inlet temperature was increased to about 677° F. Subsequent mechanical problems developed, whereupon the burning was stopped and the unit was depressured. After equipment modifications were made, the once-through nitrogen was reintroduced and its flow rate of 10.5 SCFHPC was re-established and the inlet temperature was raised to 725° F. Air was reintroduced to provide an oxygen concentration of about 1.3 mole percent. Thereafter, the burning was conducted at inlet temperatures ranging from about 725° to about 900° F. and oxygen concentrations ranging from 1.3 to 3.0. An attempt was made to maintain a maximum flame temperature of about 900° F. On one occasion only, the flame temperature reached temporarily 950° to 1,000° F. The regeneration gas that was employed was either a mixture of a flowing air stream and a flowing nitrogen stream to provide the desired oxygen concentration or a pre-mixed gas of 2 volume percent oxygen in nitrogen. Following the equipment modifications, the catalyst was treated under regeneration conditions for about 268 hours.

The next day, after the reactor had been cooled to about 600° F., an air soak of the catalyst was initiated. Air was introduced into the reactor. This air was the only gas being passed through the reactor and was employed at a rate of about 106 SCFH and a pressure of 200 psig. An increase in the temperature of about 10° F. was immediately observed throughout the length of the catalyst bed. Within the next 10 minutes, this temperature increase disappeared. During the next 4 hours, the catalyst bed temperature was increased to 900° F. while the air was being passed through the bed. This latter temperature was maintained for the next 24 hours. Thereafter air flow was stopped and the reactor was cooled to room temperature.

Appropriate catalyst samples were obtained and the remainder of the catalyst (345 gms. on a fresh catalyst basis) was charged to the reactor. The catalyst bed length was 23-11/16 inches and the length of the reactor preheat section was 17-11/16 inches. The catalyst was then tested for its activity under the previously mentioned operating conditions. During this activity test, LVGO was employed as the feedstock for the first 25 days. This operation was then followed by another 36 days of operation with the hydrocarbon blend as the feedstock. The results of this activity test are presented in Table X. This table shows the activity data obtained with both feedstocks and compares these values to those obtained from the first cycle of operation, i.e., the cycle employing the fresh catalyst, and from the second cycle, i.e., the cycle employing the catalyst that had been regenerated in the first regeneration described above.

TABLE X

| Feed stock | Days on Cycle Oil | | Temp. Requirement for 77% Conv., ° F. | Relative Activity | Temp. Decline Rate, ° F. Per Day |
|---|---|---|---|---|---|
| LVGO | 18 | 1 | 680 | 1.00 | 0.1 |
| LVGO | 18 | 2 | 689 | 0.80 | 0.1 - 0.15 |
| LVGO | 18 | 3 | 697 | 0.67 | 0.1 - 0.15 |
| Blend | 36 | 1 | 729* | 1.0 | 0.2 |
| Blend | 36 | 2 | 741 | 0.77 | 0.5 |
| Blend | 36 | 3 | 754 | 0.58 | 0.6 |

*Estimated

The temperature decline rate for the third cycle when employing the blend as the hydrocarbon feedstock was found to have been reduced to a value that did not exceed 0.3° F. per day at times later than those shown in Table X. Selectivity results obtained after the above regeneration indicated that product distribution had not been adversely affected by the loss of activity. The observed products at the higher operating temperature were essentially the same as those obtained at the lower temperature.

The results from the above regeneration tests clearly demonstrate that the catalytic composition that is employed in the present invention is capable of being regenerated and that such regeneration can be obtained at temperatures that do not exceed 900° F. This is quite unexpected in view of the statements that have been made in the prior art. For example, in U.S. Pat. No. 3,197,397, the patentes point out that most of the water generated by combustion will be formed in the relatively low temperature ranges of about 500° - 900° F. and that this is precisely in the temperature range where the catalysts containing molecular sieves and a Group VIII metal are most seriously damaged by water vapor. The above regeneration tests clearly demonstrate that the catalyst composition of the present invention can be regenerated at relatively low regeneration inlet temperatures, e.g., about 600° - 775° F., although the flame front may be as high as about 130° F. above that value. These data indicate that the catalyst of the present invention may be characterized by its ability to be regenerated at a temperature that does not exceed 900° F.

EXAMPLE VIII

Two test runs of short duration were made in bench-scale equipment employing a tubular stainless steel reactor and conventional product recovery and analytical equipment. The reactor was 20 inches in length and had an inside diameter of 0.957 inch. The reactor temperature was maintained by use of a hot molten salt bath of DuPont HITEC. The reactor temperatures were measured by means of a co-axial thermocouple. A 38-gram portion of the catalyst, in the form of 12-to-20-mesh material, was loaded into the reactor near its bottom. The remainder of the reactor was empty and served only to preheat the hydrocarbon feed charged to the unit. Each catalyst was pretreated at 500° F. and 1,250 psig with hydrogen flowing at the rate of 32 standard cubic feet of hydrogen per hour per pound of catalyst for about 21 hours.

A LVGO feed, identified as Feedstock No. 6, was introduced at 500° F. and the temperature was increased over a period of 6 hours to 625° F. Then a 50-50 blend of Feedstock No. 6 and the hereinafter-described Feedstock No. 7 was used for the next 6 hours and the temperature as needed was adjusted to maintain a conversion to gasoline and lighter products. Feedstock No. 7 was subsequently employed and the temperature was adjusted to bring the conversion level to approximately 77 weight percent conversion of total feed in single-pass operation. Hydrocarbon Feedstock No. 7 was a low-sulfur blend of 30 percent LVGO and 70 percent LCCO. Other processing conditions were: a total pressure of 1,250 psig, a WHSV of 1.38 grams of hydrocarbon per hour per gram of catalyst, and a hydrocarbon addition rate of about 9,000 SCFB. The properties of Feedstocks Nos. 6 and 7 are shown below in Table XI.

TABLE XI

| Feedstock No. | 6 | 7 |
|---|---|---|
| Gravity, ° API | 34.4 | 27.5 |
| Sulfur, wt.% | 0.16 | 0.25 |
| Nitrogen, ppm by wt. | 67 | 159 |
| Molecular type, vol.% | | |
| Aromatics | 23.1 | 42.2 |
| Paraffins | 32.5 | 23.5 |
| Naphthenes | 44.4 | 34.3 |
| ASTM Distillation, ° F. | | |
| IBP | 425 | 398 |
| 10% | 495 | 475 |
| 30% | 527 | 519 |
| 50% | 549 | 546 |
| 70% | 576 | 563 |
| 90% | 626 | 614 |
| EBP | 667 | 632 |

One catalyst for this example was prepared by first reducing the sodium content of Y-type aluminosilicate material obtained from the Linde Division of Union Carbide Corporation to 0.26 wt. percent by exchanging the material four times with ammonium sulfate solution at 200° F. This exchanged aluminosilicate material was blended into a high-alumina silica-alumina hydrogel and the mixture was dried at 200° to 250° F. and subsequently calcined at 1,000° F. for 4 hours. The resulting material was then impregnated with a solution of cobalt acetate and ammonium molybdate sufficient to fill the pore volume and then dried for about 16 hours at 200° to 250° F., pilled with Sterotex, and calcined at 1,000° F. for 4 hours. This catalyst was prepared to contain 2.5 wt. percent CoO and 5.0 wt. percent $MoO_3$ and the support material was prepared to contain about 35 wt. percent aluminosilicate material.

Another catalyst was prepared to contain 2.5 wt. percent CoO and 5.0 wt. percent $MoO_3$ by impregnating a support containing 35 wt. percent of the ultrastable, large-pore crystalline aluminosilicate material suspended in low-alumina silica-alumina with a solution of cobalt acetate and ammonium molybdate. The support material, containing 0.31 wt. percent sodium, was obtained from the Davison subsidiary of W. R. Grace & Co. The impregnated material was dried, pilled with Sterotex, and calcined for 6 hours at 1,000° F.

These two catalysts were tested as described hereinabove. The first catalyst required a temperature of 714° F. at 7 days on stream to furnish 77 percent conversion of total feed in single-pass operation and provided a calculated heavy naphtha yield of 52.0 wt. percent at 725° F., while the other catalyst required a temperature of 717° F. to give 77 percent conversion and provided a heavy naphtha yield of 50.9 wt. percent at 725° F. Hence, in this short comparative test, the two catalysts gave comparable performances.

As has been shown hereinbefore, the ultrastable, large-pore crystalline aluminosilicate material of the catalyst that is employed in the present invention is not the same as hydrogen-form and decationized Y-type aluminosilicate materials. This ultrastable aluminosilicate material has a different cubic unit cell dimension and unique hydroxy infrared bands. Even though this ultrastable aluminosilicate material is different, it may be employed in a catalytic composition that is very active for hydrocarbon conversion and that may be regenerated at a temperature that does not exceed 900° F. As shown herein, it is a most important element in a catalytic composition that is suitable for hydrocracking and is employed in the catalyst of the hydrocracking stage of a combination process which produces very high octane blending stock, as well as in the catalyst that is employed in an improved hydrocracking process.

What is claimed is:

1. A catalytic composition for use in a hydrocracking process, which catalytic composition comprises cobalt and molybdenum on a co-catalytic solid acidic support comprising ultrastable, large-pore crystalline aluminosilicate material and a silica-alumina cracking catalyst, a substantial amount of said ultrastable, large-pore crystalline aluminosilicate material being characterized by well-defined hydroxyl infrared bands near 3700 $cm^{-1}$ and near 3625 $cm^{-1}$, said ultrastable, large-pore crystalline aluminosilicate material being characterized further by a sodium content that is less than one percent, a maximum cubic unit cell dimension of 24.55 A, and a superior ability to withstand repeated wetting-drying cycles.

2. The catalytic composition of claim 1 wherein said ultrastable, large-pore crystalline aluminosilicate material is suspended in a porous matrix of said silica-alumina cracking catalyst.

3. A catalytic composition for use in a hydrocracking process, which catalytic composition comprises cobalt and molybdenum on a co-catalytic solid acidic support comprising ultrastable, large-pore crystalline aluminosilicate material and a silica-alumina cracking catalyst, said cobalt and said molybdenum being present as their oxides, said ultrastable, large-pore crystalline aluminosilicate material being suspended in a porous matrix of said silica-alumina cracking catalyst, a substantial amount of said ultrastable, large-pore crystalline aluminosilicate material being characterized by well-defined hydroxyl infrared bands near 3700 $cm^{-1}$ and near 3626 $cm^{-1}$, said ultrastable, large-pore crystalline aluminosilicate material being characterized further by a sodium content that is less than one weight percent, a maximum cubic unit cell dimension of 24.55 A, and a superior ability to withstand repeated wetting-drying cycles.

4. The catalytic composition of claim 3 wherein said cobalt is present in an amount within the range of about 2 to about 5 weight percent cobalt oxide and said molybdenum is present in an amount within the range of about 4 to about 15 weight percent molybdenum trioxide, based upon the total weight of said catalytic composition, and said ultrastable, large-pore crystalline aluminosilicate material is present in an amount within the range of about 5 to about 50 weight percent, based upon the weight of said support.

5. The catalytic composition of claim 4 wherein said catalytic composition is further characterized by its ability to be regenerated at a temperature that is less than 900° F.

6. A catalytic composition for use in a hydrocracking process, which catalytic composition comprises a Group VI metal and a Group VIII metal, oxides of a Group VI metal and a Group VIII metal, or mixtures thereof on a co-catalytic solid acidic support comprising ultrastable, large-pore crystalline aluminosilicate material and a silica-alumina cracking catalyst, a substantial amount of said ultrastable, large-pore crystalline aluminosilicate material being characterized by well-defined hydroxyl infrared bands near 3700 cm$^{-1}$ and near 3625 cm$^{-1}$, said ultrastable, large-pore crystalline aluminosilicate material being characterized further by a sodium content that is less than one percent, a maximum cubic unit cell dimension of 24.55 A, and a superior ability to withstand repeated wetting-drying cycles.

7. The catalytic composition of claim 6 wherein said ultrastable, large-pore crystalline aluminosilicate material is suspended in a porous matrix of said silica-alumina cracking catalyst.

* * * * *